United States Patent [19]

Nakano et al.

[11] Patent Number: 5,760,359
[45] Date of Patent: Jun. 2, 1998

[54] MOTOR CONTROL APPARATUS EQUIPPED WITH A CONTROLLER FOR CONTROLLING ROTATIONAL POSITION OF MOTOR

[75] Inventors: Hiromitsu Nakano, Hirakata; Kenichi Kishimoto; Tomohiro Inoue, both of Yonago, all of Japan

[73] Assignee: Matsushita Electric Industrial Co., Ltd., Osaka-fu, Japan

[21] Appl. No.: 687,022

[22] Filed: Jul. 25, 1996

[30] Foreign Application Priority Data

Jul. 31, 1995 [JP] Japan ................... 7-194817

[51] Int. Cl.⁶ ........................... H02P 5/00
[52] U.S. Cl. ................ 318/603; 318/605; 318/618; 318/800; 318/812; 318/138; 318/254
[58] Field of Search ............... 318/138, 139, 318/245, 254, 439, 800–818, 560–696; 388/812, 813

[56] References Cited

U.S. PATENT DOCUMENTS

| | | | |
|---|---|---|---|
| 3,696,277 | 10/1972 | Liska et al. | 318/138 |
| 4,088,932 | 5/1978 | Okuyama et al. | 318/138 |
| 4,763,058 | 8/1988 | Heining et al. | 318/807 |
| 4,792,741 | 12/1988 | Matsuo et al. | 318/800 |
| 4,814,677 | 3/1989 | Plunkett | 318/254 |
| 4,818,908 | 4/1989 | Tamae et al. | 318/138 |
| 4,843,291 | 6/1989 | Predina | 318/605 |
| 4,855,660 | 8/1989 | Wright et al. | 318/696 |
| 4,929,879 | 5/1990 | Wright et al. | 318/696 |
| 4,937,493 | 6/1990 | Maeno et al. | 318/685 |
| 4,999,558 | 3/1991 | Onodera et al. | 318/685 |
| 5,124,625 | 6/1992 | Wakabayashi | 318/603 |
| 5,144,564 | 9/1992 | Naidu et al. | 364/494 |
| 5,410,234 | 4/1995 | Shibata et al. | 318/700 |
| 5,585,708 | 12/1996 | Richardson et al. | 318/800 |
| 5,585,709 | 12/1996 | Jansen et al. | 318/807 |
| 5,642,461 | 6/1997 | Lewis | 388/812 |

FOREIGN PATENT DOCUMENTS 63-10668  3/1988  Japan.
2-248816  4/1990  Japan.

Primary Examiner—Paul Ip
Attorney, Agent, or Firm—Wenderoth, Lind & Ponack

[57] ABSTRACT

In a motor control apparatus for controlling a rotational position of a motor, a rotation detector detects the rotational position of the motor, and outputs first and second detection signals having phases corresponding to a detected rotational position of the motor and different from each other, and a position detecting circuit detects a rotational position in a unit which is less than one cycle of the first and second detection signals based on the first and second detection signals, and outputs a rotational position signal representing a detected rotational position. Further, a motor controller compares the rotational position signal with a reference position signal representing a reference rotational position of the motor to obtain a position error, and controls the rotational position of the motor so that the position error is minimized.

40 Claims, 14 Drawing Sheets

First Preferred Embodiment

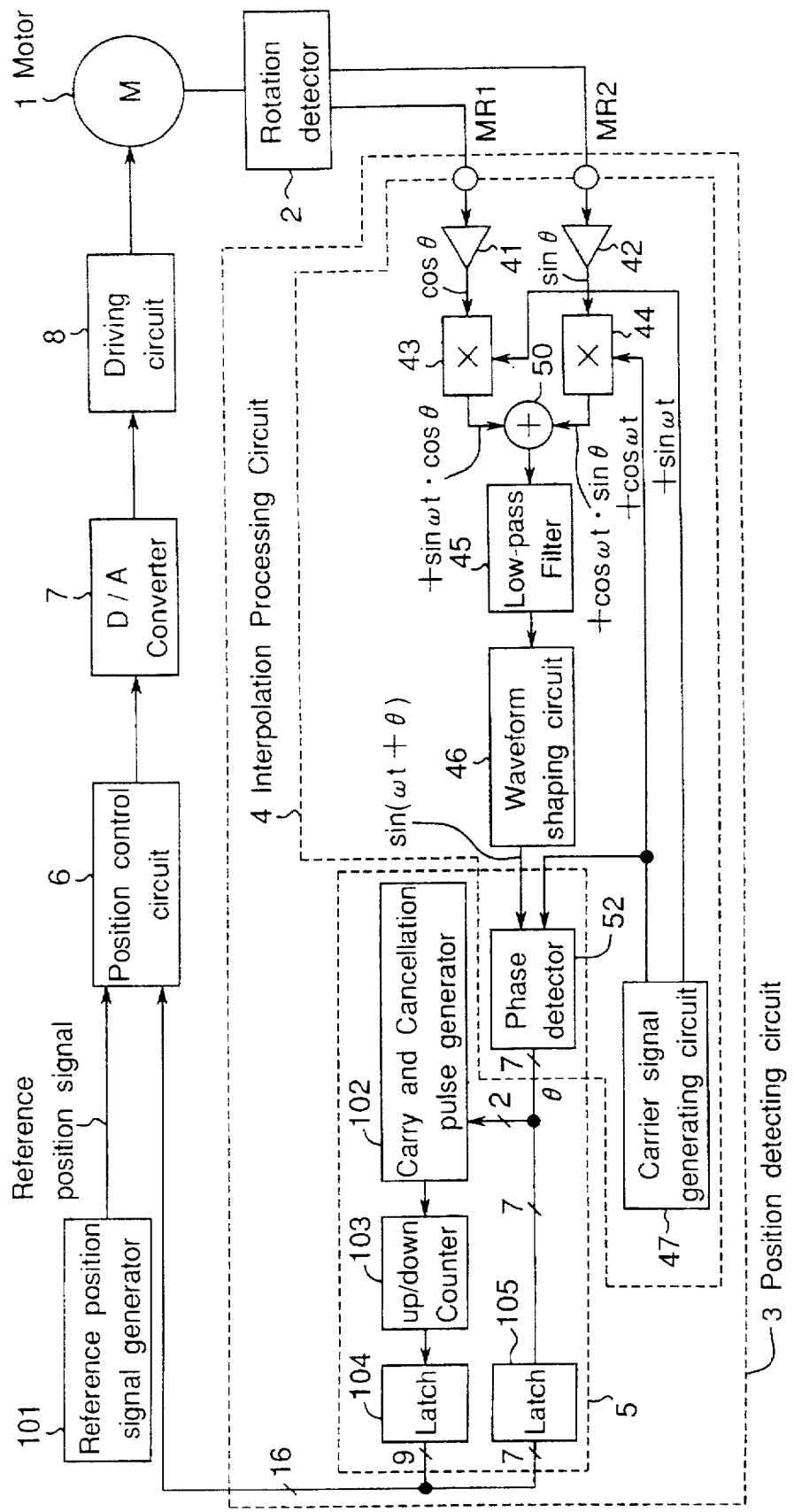

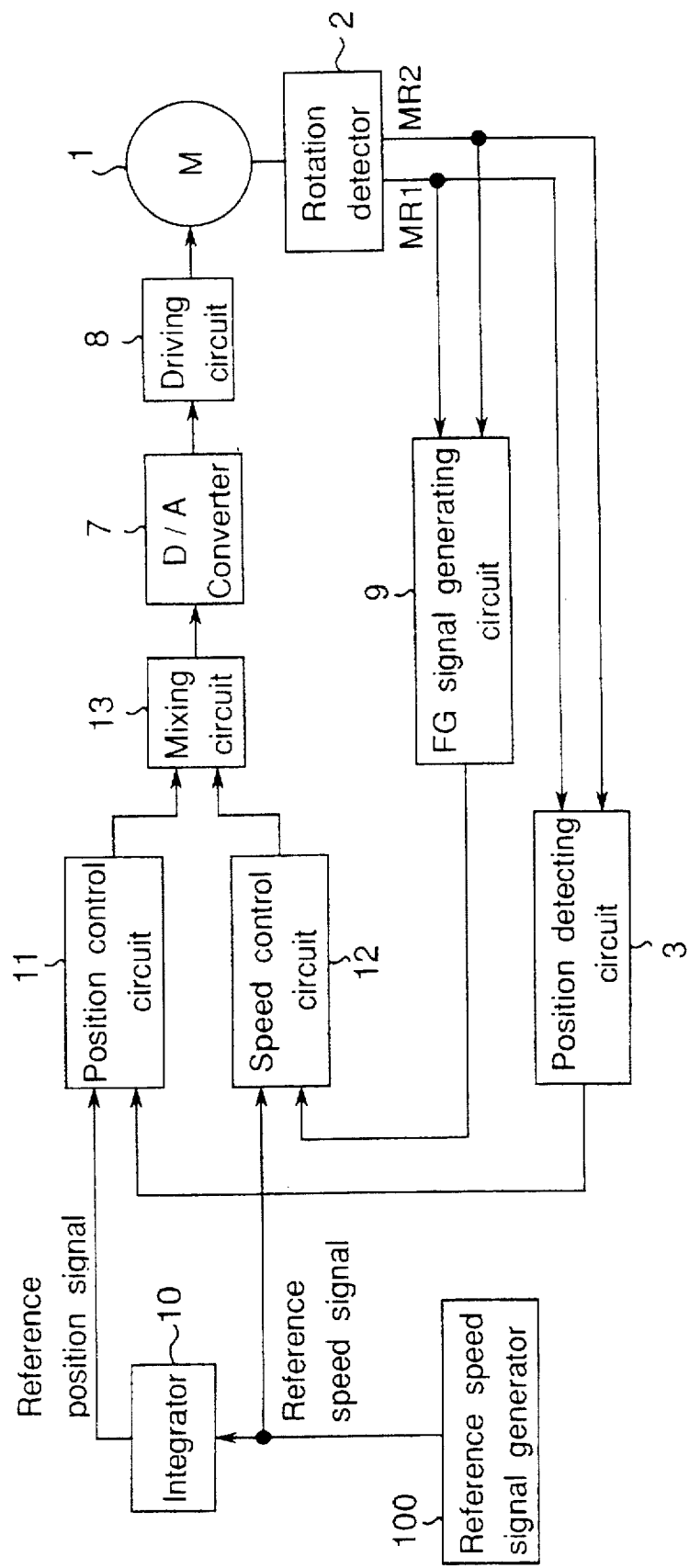
Fig. 3  Second Preferred Embodiment

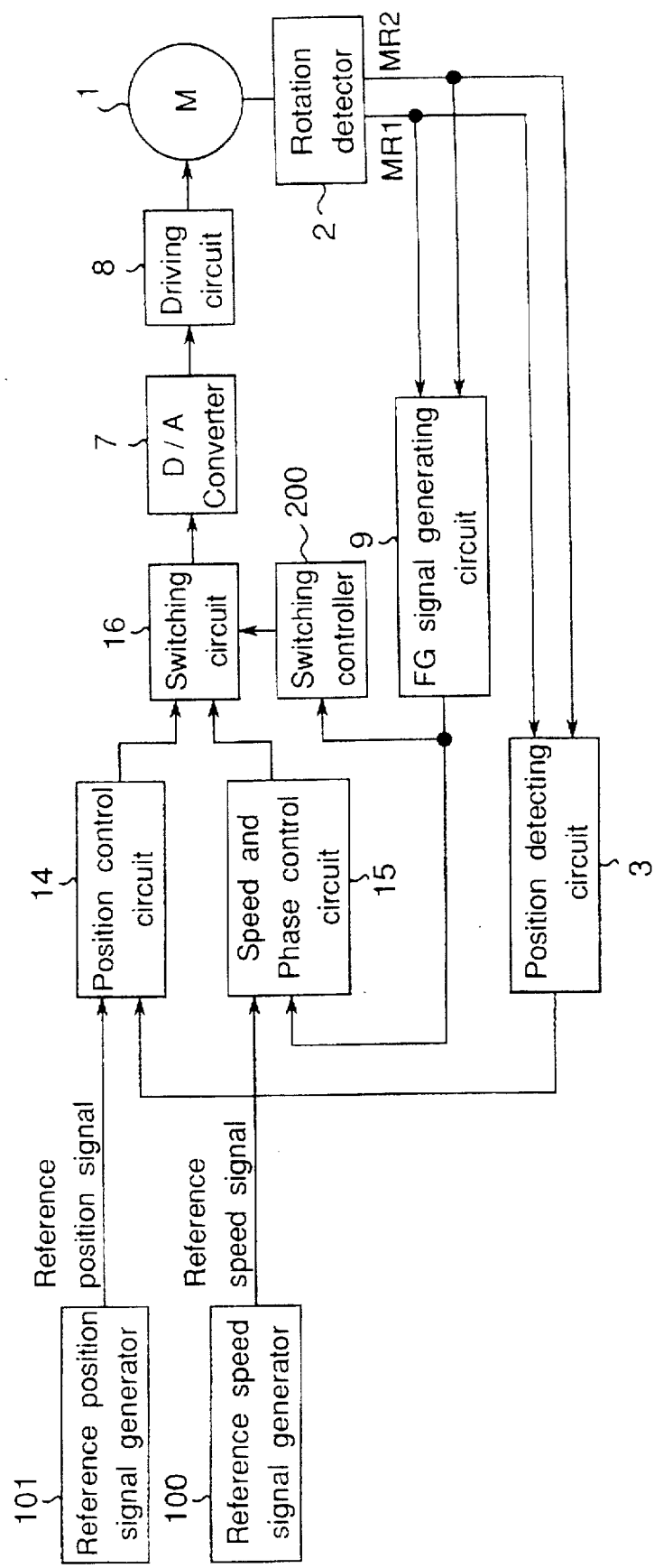
Fig. 4  Third Preferred Embodiment

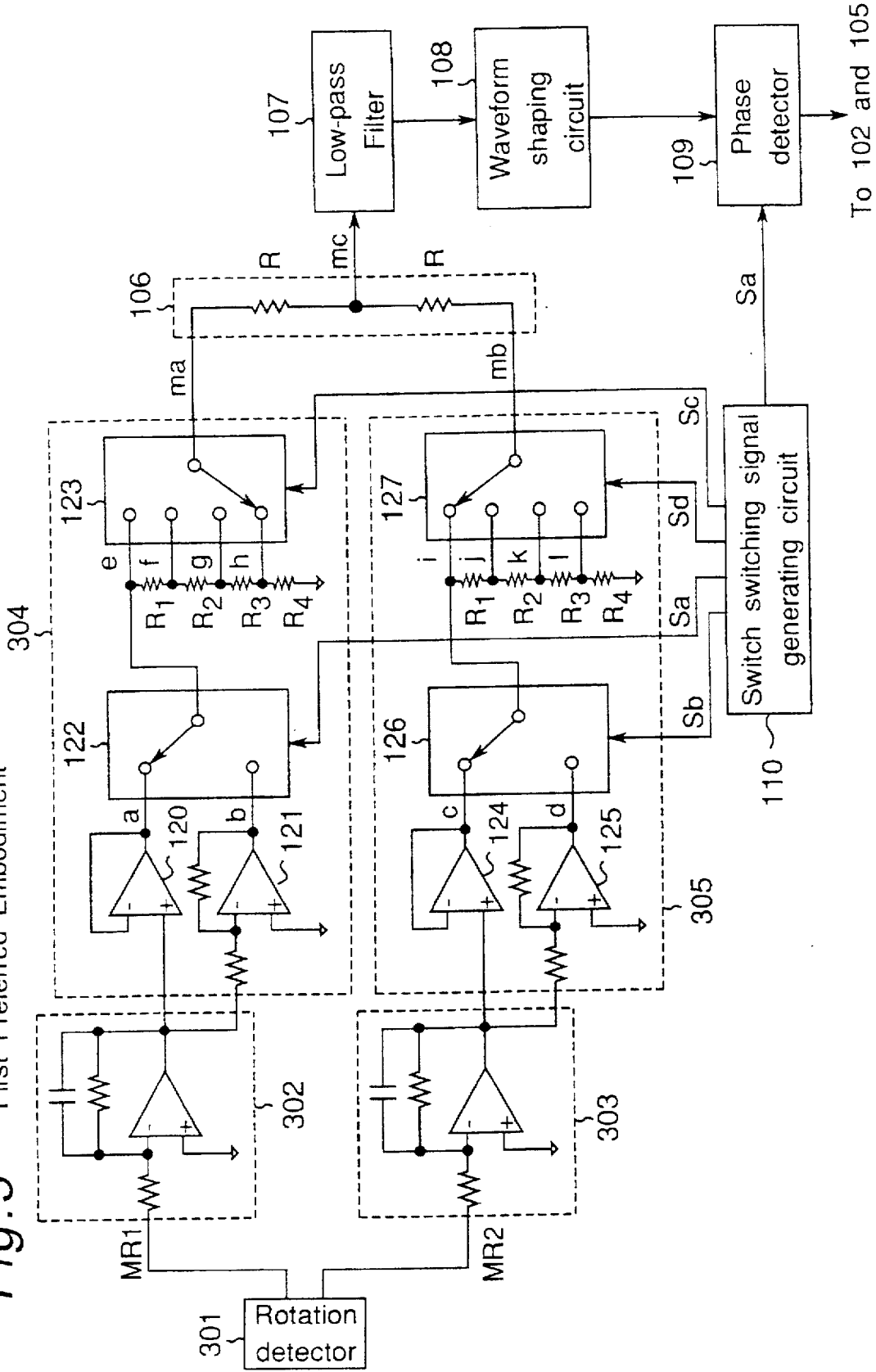
Fig.5  First Preferred Embodiment

Fig. 8  Second Preferred Embodiment

Fig. 9 Third Preferred Embodiment

Fig.12 Modified Third Preferred Embodiment

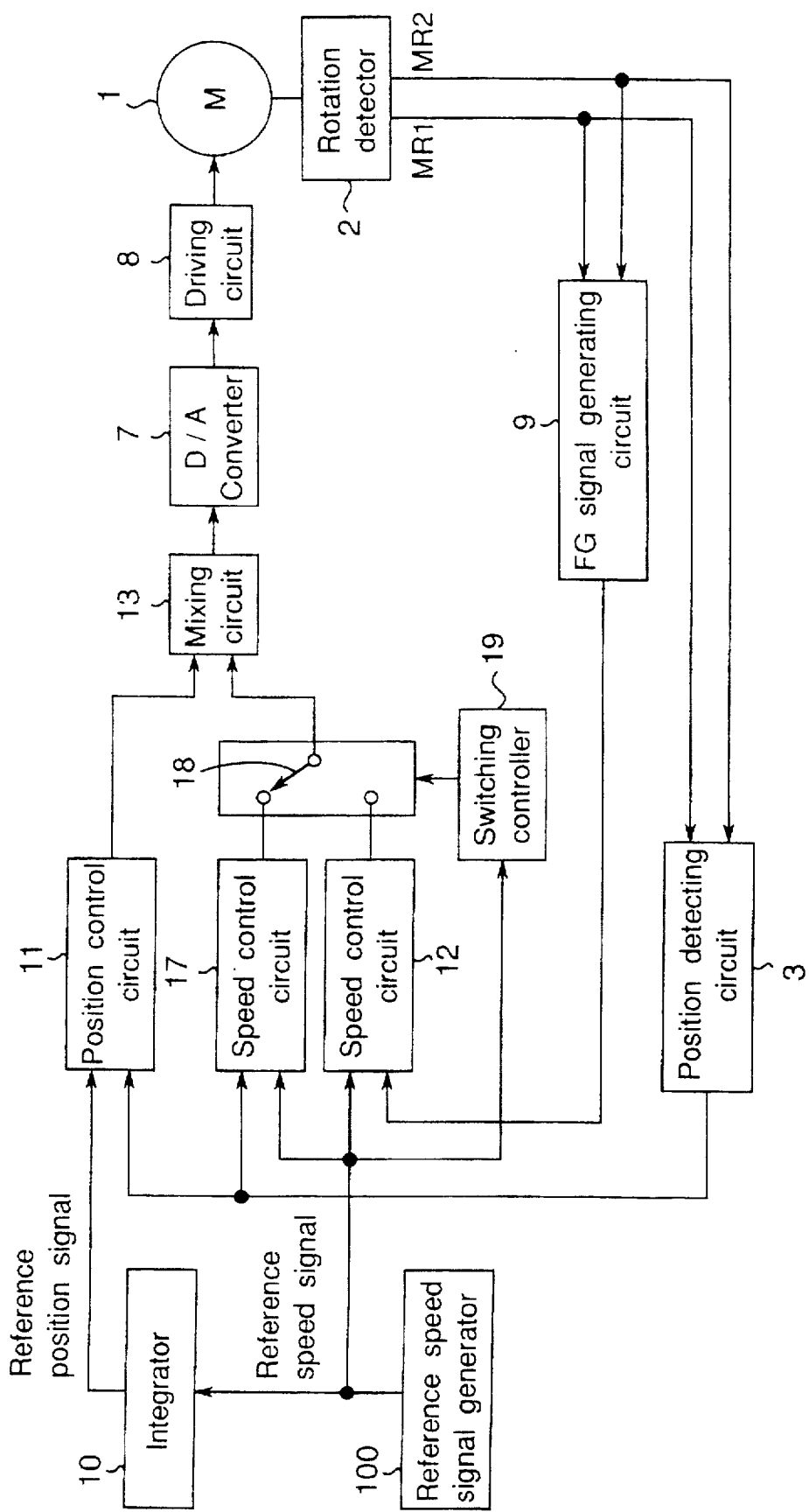
Fig.14 Modified Second Preferred Embodiment 5,760,359

1

MOTOR CONTROL APPARATUS EQUIPPED WITH A CONTROLLER FOR CONTROLLING ROTATIONAL POSITION OF MOTOR

BACKGROUND OF THE INVENTION

1. Field of the Invention

The present invention relates to a motor control apparatus for use in motors such as a brush-equipped DC motor, a brushless motor, or the like, and in particular, to a motor control apparatus equipped with a controller for controlling a rotational position of a motor so that a positional error is minimized by comparing a rotational position signal with a reference position signal, with higher-resolution position control and speed control.

2. Description of the Prior Art

In recent years, office automation equipment such as copying machines, printers or the like have been advancing toward digitization, higher definitions, and coloring. With this trend, motors used in this equipment have been increasingly required to be capable of high-resolution, high-precision rotational position control as well as high-precision speed control over a wide range of rotational speed.

An example of the motor control apparatus according to the prior art is described below with reference to the accompanying drawings.

A prior art example is described, for example, in the Japanese Patent Examined Publication (Koukoku) No. Showa 63-10668. FIG. 11 is a schematic block diagram of this conventional motor control apparatus.

Referring to FIG. 11, reference numeral 31 denotes a motor, and 32 denotes a speed generator for generating a signal representing a rotational speed of the motor 31. Denoted by 33 is an FG signal generating circuit (frequency signal generating circuit) for generating a rotational speed signal (FG signal) having a period corresponding to a rotational speed of the motor 31. A reference speed signal generator 100 generates a reference speed signal having a predetermined constant period or frequency corresponding to the FG signal, and outputs the reference speed signal to the speed control circuit 34. The above-mentioned rotational speed signal is compared with the reference speed signal from the reference speed signal generator 100 by the speed control circuit 34, and a resulting speed error signal is fed to a driving circuit 36 via a D/A converter 35. In this way, the rotational speed of the motor 31 is controlled so as to be constant.

However, the conventional motor control apparatus shown as above has had the following problems.

In the conventional motor control apparatus shown in FIG. 11, because the frequency of an output signal of the speed generator 32 decreases during a low-speed rotation, the control rate decreases, and then, it is often difficult to implement a stable speed control. Also, it is impossible to implement a motor rotational position control when the motor is stepped.

As a motor which can control the rotational position, stepping motors have been available conventionally. As is well known to those skilled in the art, in particular when the stepping motor is rotated at a low speed, the stepping motor would show significant rotational variations. Therefore, in the case where rotation control for variations in low-speed rotation is required, there has been a need for additionally providing a fly wheel having a larger inertia.

2

Also for stepping motors, it would be necessary to keep a continuous flow of a rather large driving current through driving coils for the purpose of retaining the stop position. This would pose problems in terms of heat generation and power consumption as well.

SUMMARY OF THE INVENTION

An essential object of the present invention is therefore to provide a motor control apparatus capable of performing a rotational position control with a higher resolution and a higher precision over a wide range of speed.

Another object of the present invention is therefore to provide a motor control apparatus capable of performing a rotational position control and a speed control with a higher resolution and a higher precision over a wide range of speed.

In order to achieve the above-mentioned objectiven, according to one aspect of the present invention, there is provided a motor control apparatus for controlling a rotational position of a motor, the apparatus including:

a rotation detector for detecting the rotational position of the motor, and outputting first and second detection signals having phases corresponding to a detected rotational position of the motor and different from each other;

a position detector for detecting a rotational position in a unit finer which is less than one cycle of the first and second detection signals based on the first and second detection signals outputted from the rotation detector, and outputting a rotational position signal representing a detected rotational position; and a motor controller for comparing the rotational position signal outputted from the position detector with a reference position signal representing a reference rotational position of the motor to obtain a position error, and controlling the rotational position of the motor so that the position error is minimized.

According to another aspect of the present invention, there is provided a motor control apparatus for controlling a rotational position and a rotation speed of a motor, the apparatus including:

a rotation detector for detecting the rotational position of the motor, and outputting first and second detection signals having phases corresponding to a detected rotational position of the motor and different from each other;

a position detector for detecting a rotational position in a unit which is less than one cycle of the first and second detection signals based on the first and second detection signals outputted from rotation detector, and outputting a rotational position signal representing a detected rotational position;

a frequency generator means for generating and outputting a rotation speed signal corresponding to the rotation speed of the motor based on either one of the first and second detection signals outputted from the rotation detector;

position controller for detecting a position error between a reference position signal representing a reference position of the motor and the rotational position signal outputted from the position detector, and generating and outputting a position control signal representing a detected position error;

a speed controller means for detecting a speed error between a reference speed signal representing a reference speed of the motor and the rotation speed signal outputted from the frequency signal generator, and generating and outputting a speed control signal representing a detected speed error;

a mixer for adding the position control signal outputted from the position controller and the speed control signal outputted from the speed controller, and outputting a sum signal representing a sum of an addition result; and a motor controller means for controlling the rotational position and the rotation speed of the motor based on the sum signal outputted from the mixer so that the position error and the speed error are minimized, respectively.

According to a further aspect of the present invention, there is provided a motor control apparatus for controlling a rotational position and a rotation speed of a motor, the apparatus including:

a rotation detector for detecting the rotational position of the motor, and outputting first and second detection signals having phases corresponding to a detected rotational position of the motor and different from each other;

a position detector means for detecting a rotational position in a unit which is less than one cycle of the first and second detection signals based on the first and second detection signals outputted from the rotation detector, and outputting a rotational position signal representing a detected rotational position;

a frequency signal generator means for generating and outputting a rotation speed signal corresponding to the rotation speed of the motor based on both of the first and second detection signals outputted from the rotation detector;

a position controller for detecting a position error between a reference position signal representing a reference position of the motor and the rotational position signal outputted from the position detector, and generating and outputting a position control signal representing a detected position error;

a speed controller means for detecting a speed error between a reference speed signal representing a reference speed of the motor and the rotation speed signal outputted from the frequency signal generator, and generating and outputting a speed control signal representing a detected speed error;

a mixer for adding up the position control signal outputted from the position controller and the speed control signal outputted from the speed controller, and outputting a sum signal representing a sum of an addition result; and a motor controller means for controlling the rotational position and the rotation speed of the motor based on the sum signal outputted from the mixing means so that the position error and the speed error are minimized, respectively.

According to a still further aspect of the present invention, there is provided a motor control apparatus for controlling either one of a rotational position and a rotation speed of a motor, the apparatus including:

a rotation detector for detecting the rotational position of the motor, and outputting first and second detection signals having phases corresponding to a detected rotational position of the motor and different from each other;

a position detector for detecting a rotational position in a unit which is less than one cycle of the first and second detection signals based on the first and second detection signals outputted from the rotation detector, and outputting a rotational position signal representing a detected rotational position;

a frequency signal generator means for generating and outputting a rotation speed signal corresponding to the rotation speed of the motor based on either one of the first and second detection signals outputted from the rotation detector;

a position controller for detecting a position error between a reference position signal representing a reference position of the motor and the rotational position signal outputted from the position detector, and generating and outputting a position control signal representing a detected position error;

a speed controller for detecting a speed error between a reference speed signal representing a reference speed of the motor and the rotation speed signal outputted from the frequency signal generator, and generating and outputting a speed control signal representing a detected speed error;

a switch for switching over between the position control signal outputted from the position controller and the speed control signal outputted from the speed controller so as to select either one of the position control signal and the speed control signal in accordance with the rotation speed of the motor represented by the rotation speed signal outputted from the frequency signal generator, and outputting a selected control signal; and a motor controller for controlling either one of the rotational position and the rotation speed of the motor based on the selected control signal outputted from the switch so that either one of the position error and the speed error are minimized, respectively.

According to a still more further aspect of the present invention, there is provided a motor control apparatus for controlling either one of a rotational position and a rotation speed of a motor, the apparatus including:

a rotation detector for detecting the rotational position of the motor, and outputting first and second detection signals having phases corresponding to a detected rotational position of the motor and different from each other;

a position detector for detecting a rotational position in a unit which is less than one cycle of the first and second detection signals based on the first and second detection signals outputted from the rotation detector, and outputting a rotational position signal representing a detected rotational position;

a frequency signal generator for generating and outputting a rotation speed signal corresponding to the rotation speed of the motor based on either one of the first and second detection signals outputted from the rotation detector;

a position controller for detecting a position error between a reference position signal representing a reference position of the motor and the rotational position signal outputted from the position detector, and generating and outputting a position control signal representing a detected position error;

a speed controller for detecting a speed error between a reference speed signal representing a reference speed of the motor and the rotation speed signal outputted from the frequency signal generator, and generating and outputting a speed control signal representing a detected speed error;

a switch for switching over between the position control signal outputted from the position controller and the speed control signal outputted from the speed controller so as to select either one of the position control signal and the speed control signal in accordance with the rotation speed of the motor represented by the reference speed signal, and outputting a selected control signal; and a motor controller means for controlling either one of the rotational position and the rotation speed of the motor based on the selected control signal outputted from the switch so that either one of the position error and the speed error are minimized, respectively.

In the above-mentioned motor control apparatus, the position detector preferably comprises:

a carrier signal generator for generating and outputting first and second carrier signals having frequencies higher than those of the first and second detection signals and having phases different from each other by a predetermined angle;

a modulator means for modulating the first and second carrier signals outputted from the carrier signal generator according to the first and second detection signals, respectively, and outputting modulated first and second carrier signals;

an adder for adding up the modulated first and second carrier signals outputted from the modulator, and outputting a sum signal of an addition result; and a phase detector for comparing a phase of the sum signal outputted from the adder means with a phase of either one of the first and second carrier signals outputted from the carrier signal generator, and detecting a phase representing the rotational position of the motor.

In the above-mentioned motor control apparatus, the position detector also preferably comprises:

a first inverter for inverting the first detection signal outputted from the rotation detector, and outputting an inverted first detection signal;

a second inverter means for inverting the second detection signal outputted from the rotation detector, and outputting an inverted second detection signal;

a switch switching signal generator for generating first, second, third and fourth switch switching signals at predetermined timings, respectively;

a first switch including first and second switches, the first switcher switching over the first switch between the first detection signal outputted from the rotation detector and the inverted first detection signal outputted from the first inverter so as to select one of the first detection signal and the inverted first detection signal in accordance with the first switch switching signal outputted from the switch switching signal generator, outputting a selected first signal, switching over the second switch to divide and output a voltage of the selected first signal into voltages of a plurality of n steps in a voltage-dividing ratio which is changed in accordance with the third switch switching signal outputted from the switch switching signal generator so as to select one of divided voltages, and outputting a selected second signal;

a second switcher including third and fourth switches, said second switcher switching over the third switch between the second detection signal outputted from the rotation detector and the inverted second detection signal outputted from the second inverter so as to select one of the second detection signal and the inverted second detection signal in accordance with the second switch switching signal outputted from the switch switching signal generator, outputting a selected third signal, switching over the fourth switch to divide and output a voltage of the selected third signal into voltages of a plurality of n steps in a voltage-dividing ratio which is changed in accordance with the fourth switch switching signal outputted from the switch switching signal generator so as to select one of divided voltages, and outputting a selected fourth signal;

an adder for adding up the selected second signal outputted from the first switcher and the selected fourth signal outputted from said second switcher, and outputting a sum signal of an addition result; and a phase detector means for detecting a phase representing the rotational position of the motor based on the sum signal outputted from the adder with reference to either one of the first and second switch switching signals, and outputting a phase detection signal representing a detected phase, wherein the first and second switchers switch over the first, second, third and fourth switches in voltage-dividing ratios predetermined based on a predetermined trigonometric function so that harmonic components of the selected second signal outputted from the first switcher become smaller and harmonic components of the selected fourth signal outputted from the second switcher become smaller.

In the above-mentioned motor control apparatus, the position detecting means also preferably comprises:

a first invertor for inverting the first detection signal outputted from the rotation detector, and outputting an inverted first detection signal;

a second inverter for inverting the second detection signal outputted from the rotation detector, and outputting an inverted second detection signal;

a switch switching signal generator for generating first and second switch switching signals at predetermined timings, respectively;

a first switcher including a first switch, the first switcher switching over the first switch to divide and output a voltage provided between the first detection signal and the inverted first detection signal into voltages of a plurality of 2n steps in a voltage-dividing ratio which is changed in accordance with the first switch switching signal outputted from the switch switching signal generator so as to select one of divided voltages, and outputting a selected first signal;

a second switcher including a second switch, the second switcher switching over the second switch to divide and output a voltage provided between the second detection signal and the inverted second detection signal into voltages of a plurality of 2n steps in a voltage-dividing ratio which is changed in accordance with the second switch switching signal outputted from the switch switching signal generator so as to select one of divided voltages, and outputting a selected second signal;

an adder for adding up the selected first signal outputted from the first switcher and the selected second signal outputted from the second switcher, and outputting a sum signal of an addition result; and a phase detector means for detecting a phase representing the rotational position of the motor based on the sum signal outputted from the adder with reference to either one of the first and second switch switching signals, and outputting a phase detection signal representing a detected phase, wherein the first and second switchers switch over the first and second switches in voltage-dividing ratios predetermined based on a predetermined trigonometric function so that harmonic components of the selected first signal outputted from the first switcher means become smaller and harmonic components of the selected second signal outputted from said second switcher become smaller.

In the above-mentioned motor control apparatus, the motor is preferably a brush-equipped DC motor.

In the above-mentioned motor control apparatus, the motor is alternatively and preferably a brushless motor.

In the above-mentioned motor control apparatus, the rotation detector preferably comprises:

a permanent magnet magnetized so as to have multi-poles, the permanent magnet rotating integrally with the motor; and a magneto-electric conversion element disposed close to the permanent magnet so as to be electromagnetically coupled with a magnetic field of the permanent magnet, the magneto-electric conversion element converting a change in a magnetic field of the permanent magnet corresponding to the rotational position of the motor into an electrical signal corresponding to the rotational position of the motor.

In the first aspect of the present invention, with the above-mentioned constitution, there is provided a position detector for detecting a rotational position in a unit which is less than one cycle of the output signals from the rotation detector which outputs first and second detection signals having phases corresponding to the rotational position of the motor and different from each other. Then, the signal derived from the position detector is taken as a rotational position signal, and the motor is controlled based on a positional error between the rotational position signal, which is given in a unit obtained by dividing one cycle of the first and second detection signals into a plurality of n steps for every infinitesimal time interval, and the reference position signal. Thus, high-resolution, high-precision rotational position control can be accomplished.

Further, in the second and third aspects of the present invention, the position control signal outputted from the position controller and the speed control signal outputted from the speed controller are mixed or added together with each other, or switched over therebetween. Thus, not only high-precision halt control but also high-precision rotational speed control over a wide range of speed including a low-speed rotation is enabled.

In the first to third aspects of the present invention, the output signal from the adder can be approximated to be a sine waveform, so that harmonic components can be reduced. Thus, any shift of positional information due to harmonic components can be prevented, and high-precision rotational position detection and rotational position control can be enabled.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 1 is a schematic block diagram of a motor control apparatus of the first preferred embodiment according to the present invention;

FIG. 3 is a schematic block diagram of a motor control apparatus of the second preferred embodiment according to the present invention;

FIG. 4 is a schematic block diagram of a motor control apparatus of the third preferred embodiment according to the present invention;

FIG. 5 is a circuit diagram of the first preferred embodiment of the interpolation processing circuit of the motor control apparatus according to the present invention;

FIG. 14 is a schematic block diagram of a motor control apparatus of a modified embodiment of the second preferred embodiment shown in FIG. 3.

DETAILED DESCRIPTION OF THE PREFERRED EMBODIMENTS

Figure 2A:
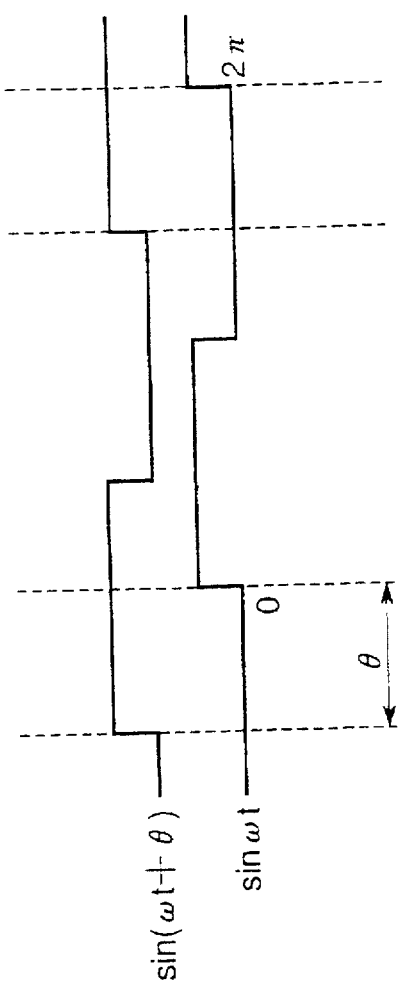
FIG. 2A is a waveform diagram showing a cosθ signal and a sinθ signal.

Preferred embodiments according to the present invention will be described below with reference to the attached drawings.

A motor control apparatus of a first preferred embodiment according to the present invention is described below with reference to the accompanying drawings.

FIG. 1 is a schematic block diagram showing the first preferred embodiment of the motor control apparatus according to the present invention.

Referring to FIG. 1, reference numeral 1 denotes a motor, and 2 denotes a rotation detector. The rotation detector 2 outputs first and second position detection signals MR1 and MR2 each having phases which correspond to a rotational angular position of the motor 1, and which are different from each other by 90°. In the present preferred embodiment, the position detection signal MR1 has a phase of cosθ, and the signal has a phase of sinθ. The position detection signals MR1 and MR2 are generated so as to have a frequency of, for example, 512 waves per rotation of the motor 1.

A block 3 enclosed by broken lines is a position detecting circuit for outputting a rotational position signal for one rotation. The position detecting circuit 3 contains an interpolation processing circuit 4 (enclosed by broken line 4) for dividing one cycle of the position detection signals MR1 and MR2 into signals each having finer or infinitesimal time intervals or periods and generating and outputting a signal representing a detailed rotation position of the motor 1. The position detecting circuit 3 is an essential important component of the present invention.

Next, the position detecting circuit 3 and the interpolation processing circuit 4 are described in more detail.

Reference numerals 41 and 42 denote amplifiers for amplifying the first and second position detection signals MR1 and MR2, respectively. Each of reference numerals 43 and 44 denotes a multiplier block, and 47 denotes a carrier signal generating circuit for generating carrier signals each having a frequency (for example, several tens kHz to several hundreds kHz) sufficiently higher than those of the position detection signals MR1 and MR2, and each having phases different from each other by 90°. The multiplier blocks 43 and 44 multiply the position detection signals amplified by the amplifiers 41 and 42, respectively, by the carrier signals from the carrier signal generating circuit 47, so that the carrier signals are modulated according to the position detection signals MR1 and MR2, respectively. In other words, the carrier signal generating circuit 47 generates two-phase carrier signals whose phases are different from each other by 90°. If one of the carrier signals is +sinωt (ω: angular velocity, t: time), then another carrier signal is cosωt or −cosωt (here the former is used for description).

One multiplier block 43 multiplies the position detection signal MR1 of one phase (cosθ) by one carrier signal (+sinωt), while another multiplier block 44 multiplies the position detection signal MR2 of the other phase (sinθ) by the other carrier signal (+cosωt).

Respective output signals (+sinωt·cosθ) and (+cosωt·sinθ) from the multiplier blocks 43 and 44 are applied to an adder 50, and then, the output signals are added up, so that an addition result of sin(ωt+θ) is obtained.

The added-up signal outputted from the adder 50 is inputted to a low-pass filter 45 for removing a high-frequency component, in which unnecessary high-frequency components are removed therefrom. The low-pass filtered signal is then inputted to a waveform shaping circuit 46 which shapes the waveform of the inputted signal into a rectangular wave, and an output signal from the waveform shaping circuit 46 is inputted to a phase detector 52.

The phase detector 52 performs a phase comparison between the output signal sin(ωt+θ) outputted from the waveform shaping circuit 46 and the output signal sinωt outputted from the carrier signal generating circuit 47, and detects a phase θ. Alternatively, the phase detector 52 may perform a phase comparison between the output signal sin(ωt+θ) outputted from the waveform shaping circuit 46 and the output signal cosωt outputted from the carrier signal generating circuit 47, and detects a phase θ.

Figure 2B:
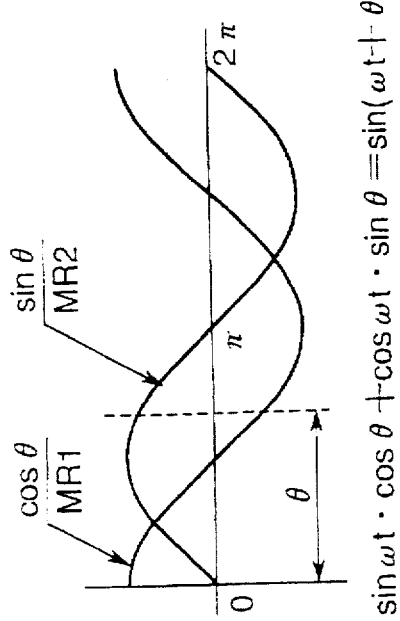
FIG. 2B is a timing chart of a sin(ωt+θ) signal and a sinωt showing an operation of a phase detector shown in FIG. 1.

More specifically, as shown in FIGS. 2A and 2B, the waveforms of the sine signals sin(ωt+θ) and sinωt are shaped into rectangular waves having the same peak-to-peak values, respectively, and the signals are compared with each other in a form of rectangular wave, where θ is extracted as the pulse width of the rectangular wave and is converted into a digital signal through an A/D conversion. Next a rotational position detecting circuit 5 including the phase detector 52 will be described in detail.

The rotational position detecting circuit 5 performs the phase comparison and a carry and cancellation process, and outputs the result thereof as rotational position data of, for example, 16 bits.

Now assume that the rotation detector 2 outputs 512 waves of the output signal MR1 or MR2 per rotation, and further divides one wave of the position detection signals MR1 or MR2 by 128. The format of the 16-bit position data assumes that more significant 9 bits are assigned to 512 waves of the position detection signal MR1 or MR2, while less significant 7 bits are assigned to the position data of 128 divisions of one wave of the position detection signals MR1 or MR2. Further, the most significant 2 bits out of the less significant 7 bits are used as carry and cancellation data.

For example, the rotational position detecting circuit 5 and the carrier signal generating circuit 47 are digital circuits. 7-bit phase data representing a rotational phase from the phase detector 52 is inputted to both of a latch 105 and a carry and cancellation pulse generator 102, and then, the carry and cancellation pulse generator 102 generates a carry pulse or a carry cancellation pulse (up/down pulse) based on the more significant two bits among the 7-bit phase data from the phase detector 52, and outputs the up/down pulse to the up/down counter 103. When the more significant two bits change from "11" to "00", then the up pulse is inputted to the up/down counter 103, the up/down counter 103 increments the counter value thereof by one. On the other hand, when the more significant two bits change from "00" to "11", then the down pulse is inputted to the up/down counter 103, the up/down counter 103 decrements the counter value thereof by one. The count value of 9 bits outputted from the up/down counter 103 is inputted to a latch 104. The latches 105 and 104 latch the inputted less significant 7-bit data and the more significant 9-bit data at periodical simultaneous timings, and then, output the rotational position signal having a 16-bit position data representing a rotational position of the motor 1 to the position control circuit 6.

Accordingly, as the motor 1 rotates, the less significant 7 bits change, for example, as 0000000, 0000001, 0000010, . . ., and a carry occurs when the more significant 2 bits out of the less significant 7 bits have changed from 11 to 00 with an overflow.

As a result, the least significant bit of the more significant 9 bits changes from 0 to 1, where the processing moves to the next one wave of the position detection signal MR1 or MR2. By repeating this process, data of all 16 bits changes every infinitesimal or minute rotational angle in response to the rotational angle of the motor 1. Thus, upon completion of one rotation of the motor 1, data of all 16 bits return to all 0's of the initial value from a state of all 1's.

On the other hand, in the case of reverse rotation of the motor 1, it is assumed that a carry cancellation occurs when the more significant 2 bits out of the less significant 7 bits have changed from 00 to 11.

By executing the above operation, positions within one rotation can be divided into 16-bit data, that is, 65536 data.

A reference position signal generator 101 generates a reference position signal representing a reference rotational position data and having data which is incremented by one at a predetermined constant time interval every $\frac{1}{2^{16}}$ of one rotation of the motor 1, and outputs the reference position signal to the position control circuit 6. It is noted that the reference position signal should be fed as a sufficiently high-resolution high-precision signal matching the trend toward higher-resolution, higher-precision position detection signals (which is applicable to the reference speed signals and the like in the later-described preferred embodiments).

The position control circuit 6 compares the reference position signal from the reference position signal generator 101 with the rotational position signal outputted from the position detecting circuit 3, and outputs a position control signal corresponding to a resulting positional error of a difference therebetween. The position control signal is inputted to a driving circuit 8 via a D/A converter 7. Then the motor 1 is controlled in rotational position so that the resulting rotational position error is minimized as close to zero as possible.

As to the signal processing from the position control circuit 6 to the D/A converter 7 to the driving circuit 8, there may be some routes, along which the positional error signal is passed to the driving circuit 8 through a digital filter, an amplifier, and a D/A converter 7, or along which the positional error signal is passed through a D/A converter 7 and then, in an analog form, through a filter and an amplifier so as to be inputted to the driving circuit 8, and so forth.

As shown above, in the motor control apparatus according to the present invention, one wave of the output signal of the rotation detector 2 is divided into a plurality of phases by the interpolation processing circuit 4, every infinitesimal time interval, and a resulting divided signal is taken as a rotational position signal. This makes it possible to implement rotational position control of high resolution and high positional precision.

FIG. 3 is a schematic block diagram showing a second preferred embodiment of the motor control apparatus according to the present invention. In FIG. 3, the same components as those of the preferred embodiment of FIG. 1 are designated by the same reference numerals in principle and their description is omitted.

Referring to FIG. 3, reference numeral 9 denotes an FG signal generating circuit for generating a rotational speed signal (FG signal) having a frequency corresponding to a rotational speed, based on an exclusive Or calculation result between both of two-phase position detection signals (referred to as two-phase signals hereinafter) MR1 and MR2 whose phases are different from each other by 90° in response to the rotational position of the motor 1. The FG signal generating circuit 9 may generate the rotational speed signal or FG signal based on either one of the two-phase signals MR1 and MR2.

A reference speed signal generator 100 generates a reference speed signal having a predetermined constant period or frequency corresponding to the FG signal, and outputs the reference speed signal to a speed control circuit 12 and an integrator 10. The integrator 10 integrates in time the reference speed signal from the reference signal generator 100, and then, outputs an integrated signal, namely, a reference position signal to a position control circuit 11.

The speed control circuit 12 compares the reference speed signal from the reference speed signal generator 100 and the rotational speed signal or FG signal from the FG signal generating circuit 9 with each other so as to generate a control signal corresponding to a resulting speed error of a speed difference therebetween.

On the other hand, the position control circuit 11, which has a constitution similar to that of FIG. 1, compares the reference position signal, which is obtained from the reference speed signal via the integrator 10, with the rotational position signal outputted from the position detecting circuit 3, and generates a control signal corresponding to a resulting positional error of a difference therebetween. The speed control signal corresponding to the speed error and the position control signal corresponding to the positional error are mixed so as to be added together by a mixing circuit 13 of an adder. The output signal from the mixing circuit 13 is inputted to the driving circuit 8 via the D/A converter 7. Thus, in the motor 1, the rotational position and the rotational speed thereof are controlled so that the positional error and the speed error are minimized, respectively, as close to zero as possible.

As shown above, in the second preferred embodiment according to the present invention, with the use of the control signal obtained by adding up the speed control signal corresponding to the speed error and the position control signal corresponding to the positional error, controlling the halt position and enhancing the rotational speed precision at a certain constant rotational speed are achieved.

When the position detecting circuit 3 detects the rotational position by the above-mentioned interpolating detection, enough of a higher resolution can be attained for a range of the low-speed rotation to implement stable control. Further, as the motor 1 comes to a higher-speed rotation, the frequency of the interpolating detection becomes higher, and this requires a higher speed processing. However, since the processing naturally has a limit speed, there is such a possibility that some error may occur.

In the second preferred embodiment of FIG. 3, the speed control circuit 12 may be changed to a speed and phase control circuit, in which the frequency and phase components of the reference speed signal and the frequency and phase components of the FG signal are compared with each other, respectively, so that signals of a speed error and a phase error can be outputted to the mixing circuit 13.

FIG. 14 shows a motor control apparatus of a modified embodiment of the second preferred embodiment shown in FIG. 3. Differences between the preferred embodiments shown in FIGS. 3 and 14 will be described hereinafter.

Referring to FIG. 14, the motor control apparatus of the modified second preferred embodiment further comprises an additional speed control circuit 17, a switch 18, and a switching controller 19. The speed control circuit 17 differentiates the rotational position signal outputted from the position detecting circuit 3 to obtain a rotation speed signal, compares the reference speed signal from the reference speed signal generator 100 with the rotation signal obtained through the differential to generate a control signal representing a speed error of a difference therebetween, and then, outputs the control signal through the switch 18 to the mixing circuit 13.

On the other hand, the speed control circuit 12 outputs the control signal through the switch 18 to the mixing circuit 13. The switching operation of the switch 18 is controlled by the switching controller 19 in accordance with the speed represented by the reference speed signal.

When the speed of the reference speed signal is equal to or lower than a predetermined threshold speed, the switching controller 19 controls the switch 18 so that the control signal from the speed control circuit 17 is outputted through the switch 18 to the mixing circuit 13. On the other hand, when the speed of the reference speed signal is higher than the predetermined threshold speed, the switching controller 19 controls the switch 18 so that the control signal from the speed control circuit 12 is outputted through the switch 18 to the mixing circuit 13.

Therefore, in the case of the low rotation speed of the motor 1, namely, even when the FG signal outputted from the FG signal generating circuit 9 has a low frequency, in a manner similar to that of the first preferred embodiment according to the present invention, the control of the rotational position and the control for the halt position can be performed. Further, in the case of a higher rotation speed, since the control signal from the speed control circuit 12 has noise components smaller than those of the control signal from the speed control circuit 17, the precision for the variation in the rotation speed can be improved.

FIG. 4 is a schematic block diagram showing a third preferred embodiment of the motor control apparatus according to the present invention, in which the occurrence of a detection limit speed for a range of high-speed rotation can be avoided. In FIG. 4, the same components as those of the preferred embodiments of FIGS. 1 and 3 are designated by the same reference numerals in principle and their description is omitted.

Referring to FIG. 4, reference numeral 15 denotes a speed and phase control circuit, which compares a rotational speed signal outputted from the FG signal generating circuit 9 with a reference speed signal from the reference speed signal generator 100, and then, generates a control signal corresponding to a frequency error of a frequency difference therebetween and a phase error of a phase difference therebetween. On the other hand, reference numeral 14 denotes a position control circuit, similar to those designated by reference numerals 6 and 11 respectively shown in FIGS. 1 and 3, which compares a reference position signal from the reference position signal generator 101 and a rotational position signal outputted from the position detecting circuit 3 with each other, and then, generates a control signal corresponding to a resulting positional error of a difference therebetween.

Reference numeral 16 denotes a control signal switching circuit, which switches over between the control signal outputted from the position control circuit 14 and the control signal outputted from the speed and phase control circuit 15, according to a rotational state or a rotational speed of the motor 1. The switching over operation of the switching circuit 16 is controlled by a switching controller 200 in accordance with the FG signal outputted from the FG signal generating circuit 9. The above-mentioned switching operation is implemented in principle by an automatic switching operation, but may also be implemented by a manual switching operation.

The output signal from the switching circuit 16 is inputted to the driving circuit 8 via the D/A converter 7, and then, either the rotational position or the rotational speed of the motor 1 is controlled in accordance with a driving control signal outputted from the driving circuit 8.

An operation of the motor control apparatus with the above-mentioned constitution will be described.

In the stages of start to a low-speed rotation having a rotational speed up to a predetermined reference rotational speed, the switching circuit 16 is switched over to the control signal derived from the position control circuit 14, in which state the rise of the number of revolutions is effected in accompaniment by the high-resolution position detection implemented by the interpolating detection continued from the start time. Thus, even at a timing when the predetermined reference number of revolutions or the predetermined reference rotational speed is reached, stable motor control can be achieved through the high-resolution rotational position control.

In order to obtain a middle-speed rotation, in a manner similar to that of the low-speed rotation, the switching circuit 16 is switched over to the control signal derived from the position control circuit 14 for the start time, in which state the rise of the number of revolutions is effected in accompaniment by the high-resolution position detection implemented by the interpolating detection. Then, at a timing when the predetermined reference rotational speed is reached, the switching circuit 16 is switched over to the control signal derived from the speed and phase control circuit 15, and then, stable rotational speed control can be achieved.

Further, in order to obtain a high-speed rotation, in a manner similar to that of the low-speed rotation, the rise of the number of revolutions is effected in accompaniment by the high-resolution position detection implemented by the interpolating detection for the start time. With the rotational speed is increased, and when the interpolating detection becomes a processing of high-frequency range until the interpolating detection enters such a high-frequency range so as to reach the detection limit speed, then the switching circuit 16 is switched over to the control signal derived from the speed and phase control circuit 15, and then, any misdetection due to the detection limit can be eliminated, and also, the rotational speed can be maintained. In addition, since the motor 1 is controlled by the rotational position control during the acceleration stage from the start time, the rotational position precision can also be maintained.

As shown above, in the third preferred embodiment according to the present invention, controlling the switching over operation among the speed error signal, the phase error signal and the positional error signal, depending on which is preferred, the enhancement of rotational position precision or the enhancement of rotational speed precision of the motor 1, namely, according to the rotational speed of the motor 1 is achieved. Accordingly, stable motor control with a higher precision can be performed in a wider speed range.

Figure 12:
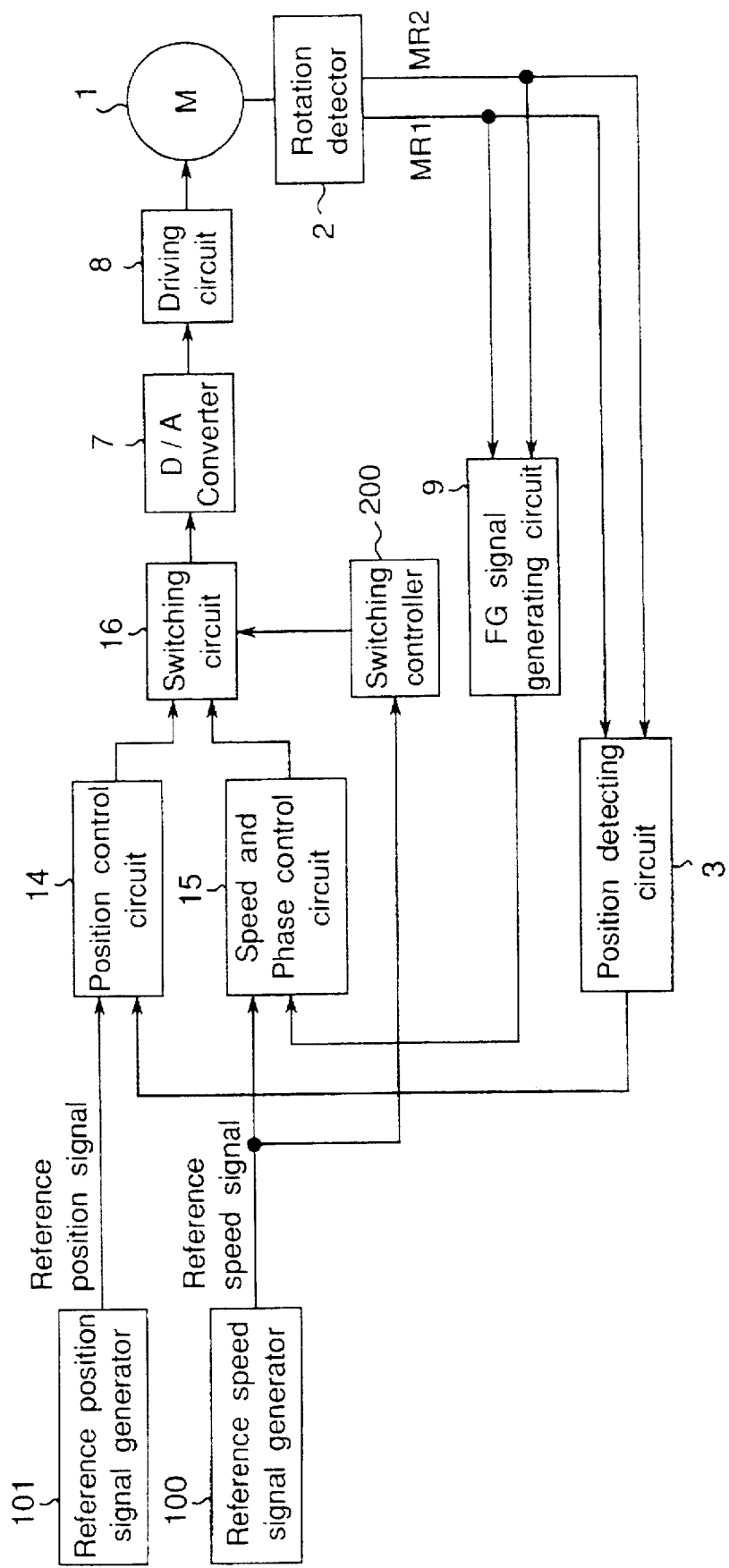
FIG. 12 is a schematic block diagram of a motor control apparatus of a modified embodiment of the third preferred embodiment shown in FIG. 4.

FIG. 12 shows a modified third preferred embodiment of the motor control apparatus which is modified from that shown in FIG. 4. As shown in FIG. 12, the switching over operation of the switching circuit 16 may be controlled by the switching controller 200, depending on the rotational speed of the motor 1 to be controlled, in accordance with the reference speed signal outputted from the reference speed signal.

Depending on the circumstances, it may be arranged that the motor control apparatus of the second preferred embodiment and the motor control apparatus of the third preferred embodiment are provided in combination, in which both of (a) the mixed motor control system for effecting the position control, and the speed and phase control and (b) the switching control system for effecting switching between the position control, and the speed and phase control are used in combination so that the two systems can be selectively switched over, thus, this makes it possible to switch over among three types of controls comprising (a) the position control, (b) the speed control (or speed and phase control), and (c) the mixed control of position control and speed control (or speed and phase control). With this arrangement, various kinds of controls can be performed according to the type and rotational state of the motor 1 to be controlled.

Now preferred embodiments of the interpolation processing circuit 4 included in the position detecting circuit 3 of the preferred embodiments according to the present invention shown in FIGS. 1, 3, and 4 will be described in detail.

The conventional interpolation processing circuit is exemplified by one as described in the Japanese Patent Laid-Open Publication No. Heisei 2-248816. With this arrangement, however, there would be some cases where the output signal from the mixer contains such a large amount of unnecessary high-frequency components, and unnecessary components which have failed to be removed by the filter appear as a deterioration in positional information, and then, this requires further improvement in order to achieve the high-precision position control.

FIG. 5 is a circuit diagram of a preferred embodiment of the interpolation processing circuit 4 of the motor control apparatus according to the present invention, which has been adapted to more practical use with the aim of improving those problems.

Referring to FIG. 5, reference numeral 301 denotes a rotation detector, which outputs two-phase signals MR1 and MR2 each having a phases which correspond to a rotational position of the motor 1 and which are different from each other by 90°. Reference numerals 302 and 303 denote amplifiers for amplifying two-phase signals MR1 and MR2 from the rotation detector 301, respectively.

Reference numerals 304 and 305 denote first and second voltage-dividing ratio switching circuits, respectively, for dividing the voltages of the output signals MR1 and MR2 through the amplifiers 302 and 303 from the rotation detector 301, into voltages according to pre-programmed voltage-dividing ratios at respective predetermined timings. Each of the first and second voltage-dividing ratio switching circuits 304 and 305 divides the voltage or the inverted voltage (inverted by each of inverting buffers 121 and 125) of each of the output signals MR1 and MR2 amplified by the amplifiers 302 and 303 after being outputted from the rotation detector 301, into voltages of a plurality of n steps (where n is an integer equal to or larger than 2, and n=8 in the present preferred embodiment), in accordance with switch switching signals Sa, Sb, Sc and Sd generated by and outputted from a switch switching signal generating circuit 110.

The switching operation is effected every minute or infinitesimal time interval which is obtained by dividing one cycle of the carrier signals described in FIG. 1 into a plurality of n infinitesimal time intervals, where n=16, for example. This will be described later with reference to FIG. 6.

The first voltage-dividing ratio switching circuit 304 comprises a non-inverting buffer 120, an inverting buffer 121, a two-contact type analog switch 122 for selecting one of the output signals from the two buffers 120 and 121, and a four-contact type analog switch 123 having a resistance voltage divider for switching the voltage-dividing ratio in four steps. The switch 123 has voltage-dividing resistors R1 to R4 for voltage division in four steps, where the resistance values of the resistors are selected so that the voltage of the output signals from the switch 122 is divided at ratios predetermined based on a trigonometric function as will be described later. The switching operation of the voltage-dividing ratio by the first voltage-dividing ratio switching circuit 304 is executed in accordance with the switch switching signals Sa and Sc.

The second voltage-dividing ratio switching circuit 305 comprises a non-inverting buffer 124, an inverting buffer 125, a two-contact type analog switch 126 for selecting one of the output signals from the two buffers 124 and 125, and a four-contact type analog switch 126 having a resistance voltage divider for switching the voltage-dividing ratio in four steps. The switch 126 has voltage-dividing resistors R1 to R4 for voltage division in four steps, where the resistance values of the resistors are selected so that the voltage of the output signals from the switch 126 is divided at ratios predetermined based on a trigonometric function as will be described later. The switching operation of the voltage-dividing ratio by the first voltage-dividing ratio switching circuit 305 is executed in accordance with the switch switching signals Sb and Sd.

Designated by reference numeral 106 is an adder circuit for performing an addition of output signals outputted through resistors R and R from the first and second voltage-dividing ratio switching circuits 304 and 305.

Designated by reference numeral 107 is a low-pass filter for removing high-frequency components from an output signal outputted from the adder circuit 106. Reference numeral 108 denotes a waveform shaping circuit for shaping a signal from which unnecessary components have been removed by the low-pass filter 107, into a rectangular wave. Reference numeral 109 denotes a phase detector which detects the phase θ by making a phase comparison between the signal outputted from the waveform shaping circuit 108 and the signal Sa (or Sb in a further preferred embodiment) outputted from the switch switching signal generating circuit 110, and then, outputs data representing the detected phase θ to the latch 105 and the carry and cancellation pulse generator 102 shown in FIG. 1. An operation of the present interpolation processing circuit 4 shown in FIG. 5 will be described below.

The rotation detector 301 outputs the two-phase signals MR1 and MR2 having phases which correspond to the rotational position of the motor 1, and which are different from each other by 90°. The amplifiers 302 and 303 amplify those two-phase signals MR1 and MR2, respectively. The output signal from the amplifier 302 is represented by Acosθ, and the output signal from the amplifier 303 is represented by Asinθ, where A is the amplitude of each of the amplified output signals MR1 and MR2 through the amplifiers 302 and 303 from the rotation detector 301, and θ is the phase thereof.

Reference characters Sa, Sb, Sc and Sd represent first, second, third and fourth switch switching signals, respectively. The switch switching timings shown in FIG. 6 are determined by these switch switching signals Sa, Sb, Sc and Sd.

Figure 6:
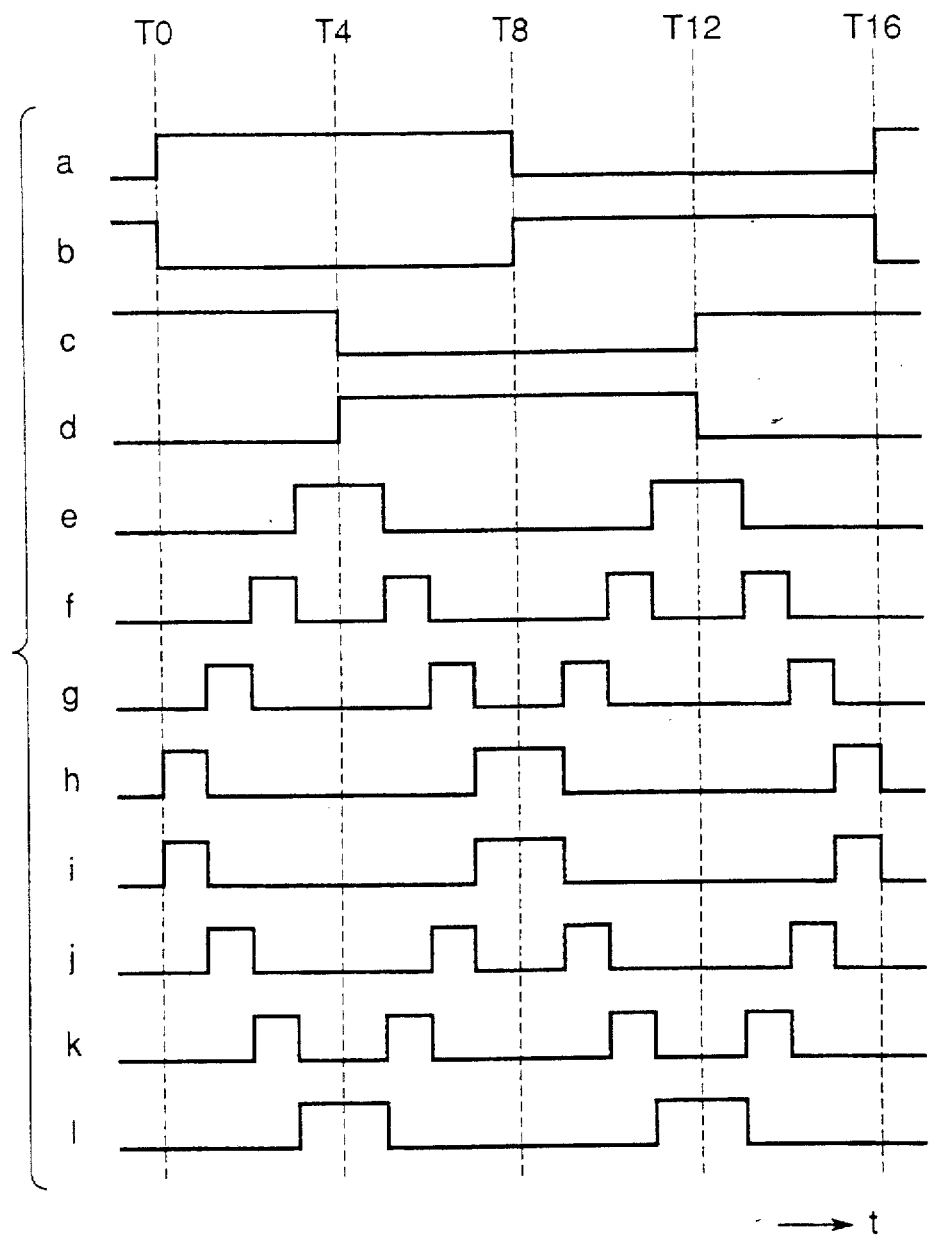
FIG. 6 is a timing chart showing switching timings of switch switching signals of FIG. 5.

FIG. 6 shows timings for switching effected by the first and second voltage-dividing ratio switching circuits 304 and 305.

In FIG. 6, it is shown that the switches 122, 123, 126 and 127 are connected to switch terminals a, b, c, d, e, f, g, h, i, j, k and l of FIG. 5 during the High periods thereof. In FIG. 6, the horizontal axis represents the time, where the time interval from T0 to T16 shown in FIG. 6 is assumed to be one cycle, and the timing of T0 serves as a reference timing for phase comparison.

Figure 7:
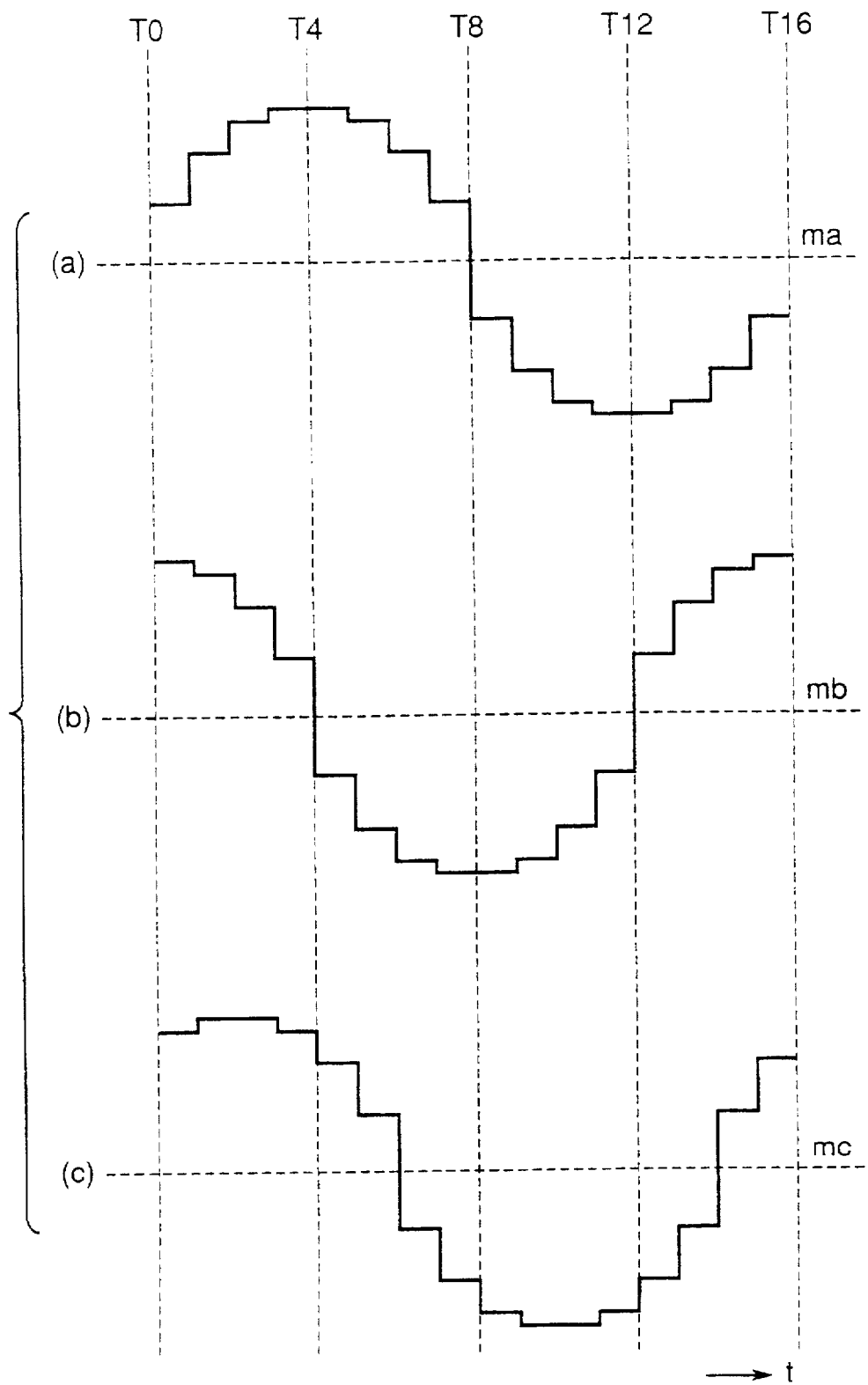
FIG. 7 is a timing chart showing switched signals "ma", "mb" and "mc" of FIG. 5.

FIG. 7(a) shows a state in which the first voltage-dividing ratio switching circuit 304 switches the voltage-dividing ratio in four steps on the output signal from either the non-inverting buffer 120 or the inverting buffer 121, in accordance with the switch switching signals Sa and Sc, and FIG. 7(a) shows a change in the output signal "ma" voltage-divided at the voltage-dividing ratios during one cycle period by the voltage-dividing ratio switching circuit 304. The resistance values of R1, R2, R3 and R4 shown in FIG. 5 are previously determined so that the amplified output signal MR1 from the rotation detector 301 is divided into voltages of four steps at predetermined ratios predetermined based on a trigonometric function.

The changing waveform voltage-divided at the predetermined voltage-dividing ratios shown in FIG. 7(a) corresponds to a stair-shaped waveform resulting from digitizing in time one carrier signal sinωt in predetermined minute or infinitesimal time intervals (or sampling and holding the same carrier signal) which are minute divisions of one cycle of the carrier signal. Therefore, the voltage of the amplified output signal MR1=Acosθ from the rotation detector 301 is divided into the voltages of eight steps in the present preferred embodiment according to the above-mentioned voltage-dividing ratios, and then, this results in an output signal "ma" from the first voltage-dividing ratio switching circuit 304. In other words, the output signal "ma" from the first voltage-dividing ratio switching circuit 304 is the result of such a process that the voltage of one detection signal MR1 outputted from the rotation detector 301 is divided into voltages of eight steps, using the resistors R1 to R4, at the ratios predetermined based on a trigonometric function (sinωt), in accordance with the switch switching signals Sa and Sc shown in FIG. 5. The output signal "ma" can be approximated to the waveform represented by the following equation (1):

$$ma = A\cos\theta \cdot \sin\omega t \qquad (1)$$

where if the period from T0 to T16 shown in FIG. 6 is one cycle, then ω is the angular frequency and t is the time. In FIG. 7(a), although the waveform of "ma" is different from that of sinωt by a change of cosθ, the waveform of "ma" is shown by the change at the voltage-dividing ratios predetermined based on sinωt, as an example, for a better understanding of the change in the voltage-dividing ratios. Further, the plotting of the change in the output signal "ma" due to a change in cosθ for one cycle period is omitted in FIG. 7(a).

Figure 13:
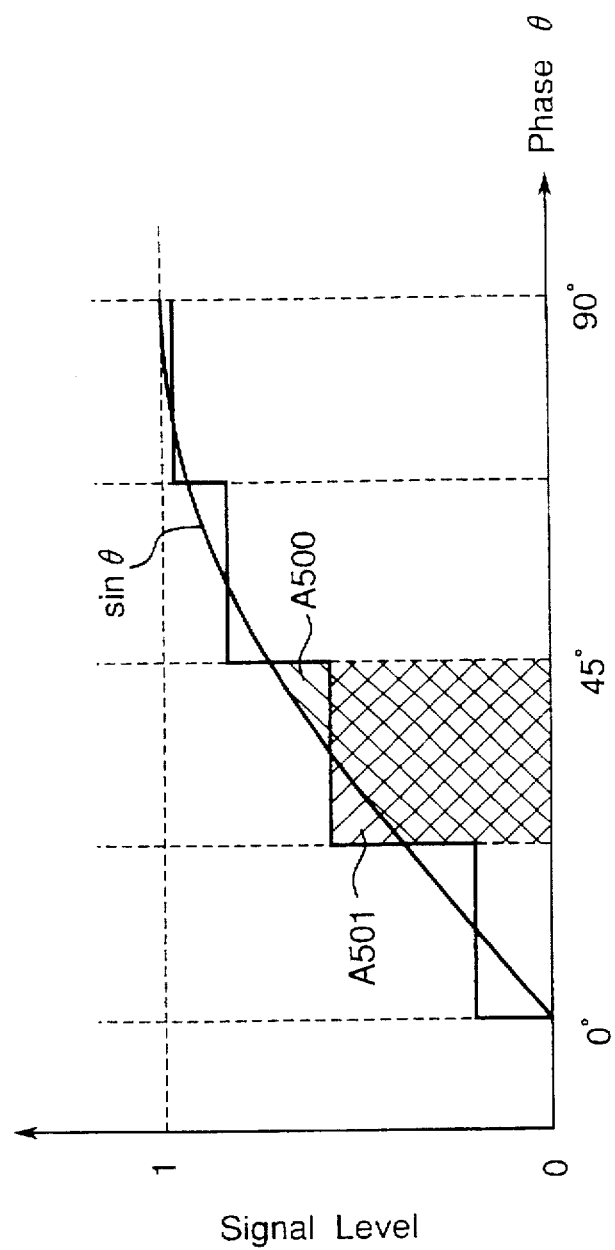
FIG. 13 is a waveform diagram showing an operation of generation of switch switching signals.

By the way, the voltage-dividing ratios by the resistors R1, R2, R3 and R4 are previously determined so as to be equal to the ratios of the voltages when the waveform of sinωt is digitized into four time intervals each having 22.5 degrees for a quarter of cycle from 0 degree to 90 degrees and is approximated into a stair-shaped waveform as shown in FIG. 13, so that the difference or the distortion between the waveform of sinωt (or cosωt in a further preferred embodiment) and the stair-shaped waveform, namely, harmonic components of the stair-shaped waveform becomes smaller or the minimum as small as possible. Concretely speaking, as shown in FIG. 13, for example, the signal level of the stair-shaped waveform for a phase range from 22.5 degrees to 45 degrees is determined so that an area A500 of the sin θ waveform hatched from the top right toward the bottom left becomes equal to an area A501 of the stair-shaped waveform hatched from the top left toward the bottom right. In another example, the signal level of the stair-shaped waveform for a phase range from 22.5 degrees to 45 degrees may be determined so as to be equal to the time average value of the sin θ waveform. In a further example, the signal level of the stair-shaped waveform for a phase range from 22.5 degrees to 45 degrees may be determined so as to be equal to half the sum of the maximum and minimum levels of the sin θ waveform.

Further, FIG. 7(b) shows a change in the output signal "mb" voltage-divided at the voltage-dividing ratios by the voltage-dividing ratio switching circuit 305, when the voltage of another detection signal MR2 from the rotation detector 301 is divided into voltages of eight steps, so as to be approximated to the stair-shaped waveform which is the result of digitizing another carrier signal cosωt as in FIG. 7(a).

In other words, the output signal "mb" from the second voltage-dividing ratio switching circuit 305 is a result of such a process that the voltage of the output signal MR2=sinθ from the rotation detector 301 is divided using the four resistors R1 to R4 at ratios predetermined based on a trigonometric function (cosωt) in accordance with the switch switching signals Sb and Sd. The output signal "mb" can be approximated to the waveform represented by the following equation (2):

$$mb = A\sin\theta \cdot \cos\omega t \quad (2)$$

In this case also, although the waveform of the output signal "mb" is different from that of cosωt by change in sinθ, FIG. 7(b) shows the change in the output signal "mb" voltage-divided at the voltage-dividing ratios based on cosωt, for the same reason as that of FIG. 7(a).

As shown above, the first and second voltage-dividing ratio switching circuits 304 and 305 operate to process the first and second carrier signals sinωt and cosωt, respectively, by dividing and digitizing (or sampling and holding) their one cycle into the units of a predetermined minute or infinitesimal time interval, and then, the digitized first and second carrier signals are multiplied by the detection output signals MR1=cosθ and MR2=sinθ, respectively.

The adder circuit 106 performs an addition of the output signals "ma" and "mb" from the first and second voltage-dividing ratio switching circuits 304 and 305.

FIG. 7(c) shows the output signal "mc" after the addition by the addition circuit 106. The output signal "mc" from the adder circuit 106 is expressed by the following equation (3), showing that phase information is included therein:

$$mc = \tfrac{1}{2}(ma+mb) = \tfrac{1}{2}A\sin(\omega t+\theta) \quad (3)$$

Designated by reference numeral 107 is the low-pass filter for removing high-frequency components from an output signal of the adder circuit 106. Reference numeral 108 denotes a waveform shaping circuit for shaping a signal from which unnecessary components have been removed by the low-pass filter 107, into a rectangular wave.

The phase detector 109 detects the phase θ by making a phase comparison between a signal containing phase information and outputted from the waveform shaping circuit 108 and the switch switching signal Sa outputted from the switch switching signal generating circuit 110.

As seen above, the interpolation processing circuit 4 of the present preferred embodiment can approximate to a sine waveform, the output signal from the adder circuit 106 is a result of adding up the output signals "ma" and "mb" voltage-divided in eight steps for each switching of the switches 122 and 123 or 126 and 127 and outputted from the first and second voltage-dividing ratio switching circuits 304 and 305.

Further, by increasing the number of steps of voltage division by the voltage-dividing ratio switching circuits 304 and 305, the output signal "mc" from the adder circuit 106 can be approximated further to a sine wave, and then, the high-frequency components can be decreased. Therefore, the phase characteristics of the low-pass filter 107 can be improved so that the high-precision rotational position detection can be performed.

Figure 8:
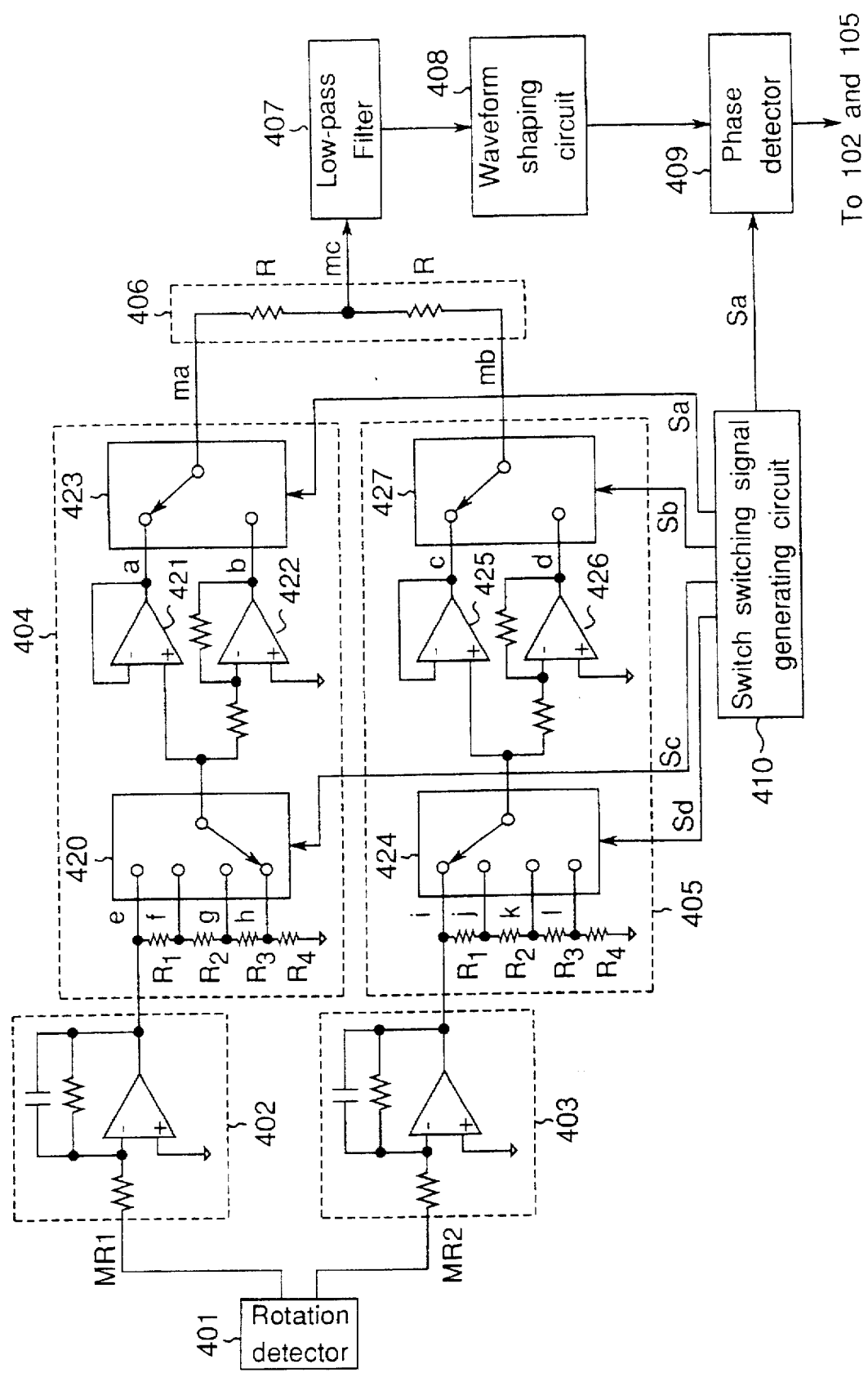
FIG. 8 is a circuit diagram of the second preferred embodiment of the interpolation processing circuit of the motor control apparatus according to the present invention.

FIG. 8 is a circuit diagram of a second preferred embodiment of the interpolation processing circuit 4 of the motor control apparatus according to the present invention.

Referring to FIG. 8, reference numeral 401 denotes a rotation detector, which generates and outputs two-phase signals MR1 and MR2 having two phases which correspond to a rotational position of the motor 1 and which are different from each other by 90°. Reference numerals 402 and 403 denote amplifiers for amplifying the output signals MR1 and MR2 from the rotation detector 401. Reference numerals 404 and 405 denote first and second voltage-dividing ratio switching circuits, respectively, which divide the voltages of the output signals MR1 and MR2 or the inverted signals thereof, which are amplified by the amplifiers 402 and 403 after being outputted from the rotation detector 401, into voltages of a plurality of n steps (n=8 in the present preferred embodiment) in accordance with the switch switching signals Sa to Sd outputted from a switch switching signal generating circuit 410, and then, which switch the voltages of the output signals MR1 and MR2 or the inverted signals thereof in accordance with the switch switching signals Sa to Sd.

Designated by reference numeral 406 is an adder circuit for performing an addition of the output signals from the first and second voltage-dividing ratio switching circuit 404 and 405. Designated by reference numeral 407 is a low-pass filter for removing high-frequency components from the output signal from the adder circuit 406. Reference numeral 408 denotes a waveform shaping circuit for shaping a signal from which unnecessary components have been removed by the low-pass filter 407, into a rectangular wave. Reference numeral 409 denotes a phase detector which detects the phase θ by making a phase comparison between a signal outputted from the waveform shaping circuit 408 and a switch switching signal Sa (Sb in a further preferred embodiment) outputted from the switch switching signal generating circuit 410, and then, outputs data representing the detected phase θ to the latch 105 and the carry and cancellation pulse generator 102 shown in FIG. 1.

Referring to FIG. 8, the first voltage-dividing ratio switching circuit 404 comprises a four-contact type analog switch 420, a non-inverting buffer 421, an inverting buffer 422, and a two-contact type analog switch 423. In a manner similar to that of the first voltage-dividing ratio switching circuit 404, the second voltage-dividing ratio switching circuit 405 comprises a four-contact type analog switch 424, a non-inverting buffer 425, an inverting buffer 426, and a two-contact type analog switch 427.

The timings of the switch switching signals Sa, Sb, Sc and Sd are the same as those of the first preferred embodiment of the interpolation processing circuit 4. The output signals "ma" and "mb" from the first and second voltage-dividing ratio switching circuits 404 and 405 and the output signal "mc" from the adder circuit 406 are the same as those of the first preferred embodiment of the interpolation processing circuit 4. As shown above, in the present preferred embodiment, detecting the rotational position with a higher precision, in a manner similar to that of the first preferred embodiment of the interpolation processing circuit 4 is achieved. However, as shown in FIG. 8, the non-inverting buffers 421 and 425 and the inverting buffers 422 and 426 are disposed in succession to the four-contact type analog switches 420 and 424 which perform the voltage division by the resistors R1 to R4, in which the switching operation of the two-contact type analog switches 423 and 427 is performed in accordance with the switch switching signals Sa and Sb.

Therefore, in the first preferred embodiment of the interpolation processing circuit 4 shown in FIG. 5, when the turn-on resistances of the two-contact type analog switches 122 and 126 are changed, there occur differences in amplitude between the respective output signals from the first and second voltage-dividing ratio switching circuits 304 and 305. This causes such a possibility that the detection precision of rotational position may deteriorate.

In contrast to this, the circuit arrangement of the second preferred embodiment of the interpolation processing circuit 4 shown in FIG. 8 causes such an effect that influences of variations in the turn-on resistance values of the analog switches 423 and 427 can be reduced by increasing the resistance value of the resistor R of the adder circuit 406.

Figure 9:
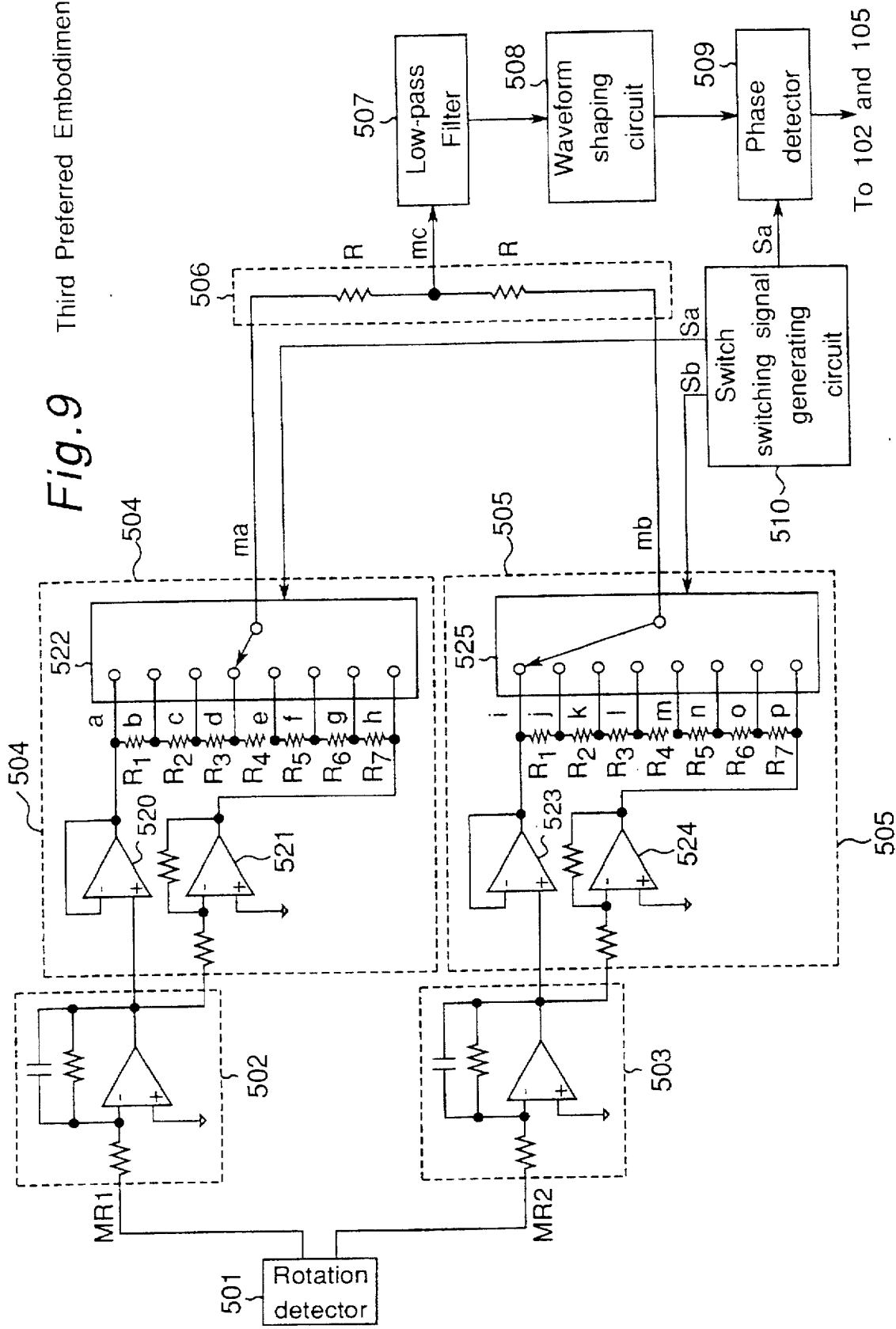
FIG. 9 is a circuit diagram of the third preferred embodiment of the interpolation processing circuit of the motor control apparatus according to the present invention.

Next, FIG. 9 is a circuit diagram of a third preferred embodiment of the interpolation processing circuit 4 of the motor control apparatus according to the present invention.

Referring to FIG. 9, reference numeral 501 denotes a rotation detector, which outputs the two phase signals having phases which correspond to a rotational position of the motor 1 and which are different from each other by 90°. Reference numerals 502 and 503 denote amplifiers for amplifying output signal from the rotation detector 501. Reference numerals 504 and 505 denote first and second voltage-dividing ratio switching circuits, respectively, for dividing the voltages or the inverted voltages of the output signals amplified by the amplifiers 502 and 503 after being outputted from the rotation detector 501, into voltages of a plurality of 2n steps (2n=8 in the present preferred embodiment) in accordance with the switch switching signals Sa and Sb outputted from a switch switching signal generating circuit 510, switching the switches 522 and 525 in accordance with the switch switching signals Sa and Sb, and outputs switched voltage signals "ma" and "mb". Designated by reference numeral 506 is an adder circuit for performing the addition of the output signals "ma" and "mb" from the first and second voltage-dividing ratio switching circuits 504 and 505. Designated by reference numeral 507 is a low-pass filter for removing high-frequency components from an output signal of the adder circuit 506. Reference numeral 508 denotes a waveform shaping circuit for shaping a signal from which unnecessary high-frequency components have been removed by the low-pass filter 507, into a rectangular wave.

Reference numeral 509 denotes a phase detector which detects the phase θ, as described with reference to FIG. 5, by making a phase comparison between a signal outputted from the waveform shaping circuit 508 and a switch switching signal Sa (or Sb in a further preferred embodiment) outputted from the switch switching signal generating circuit 510, and then, outputs data representing the detected phase θ to the latch 105 and the carry and cancellation pulse generator 102 shown in FIG. 1.

Referring to FIG. 9, the first voltage-dividing ratio switching circuit 504 comprises a non-inverting buffer 520, an inverting buffer 521, and an eight-contact type analog switch 522.

In a manner similar to that of the first voltage-dividing ratio switching circuit 504, the second voltage-dividing ratio switching circuit 505 comprises a non-inverting buffer 523, an inverting buffer 524, and an eight-contact type analog switch 525.

Figure 10:
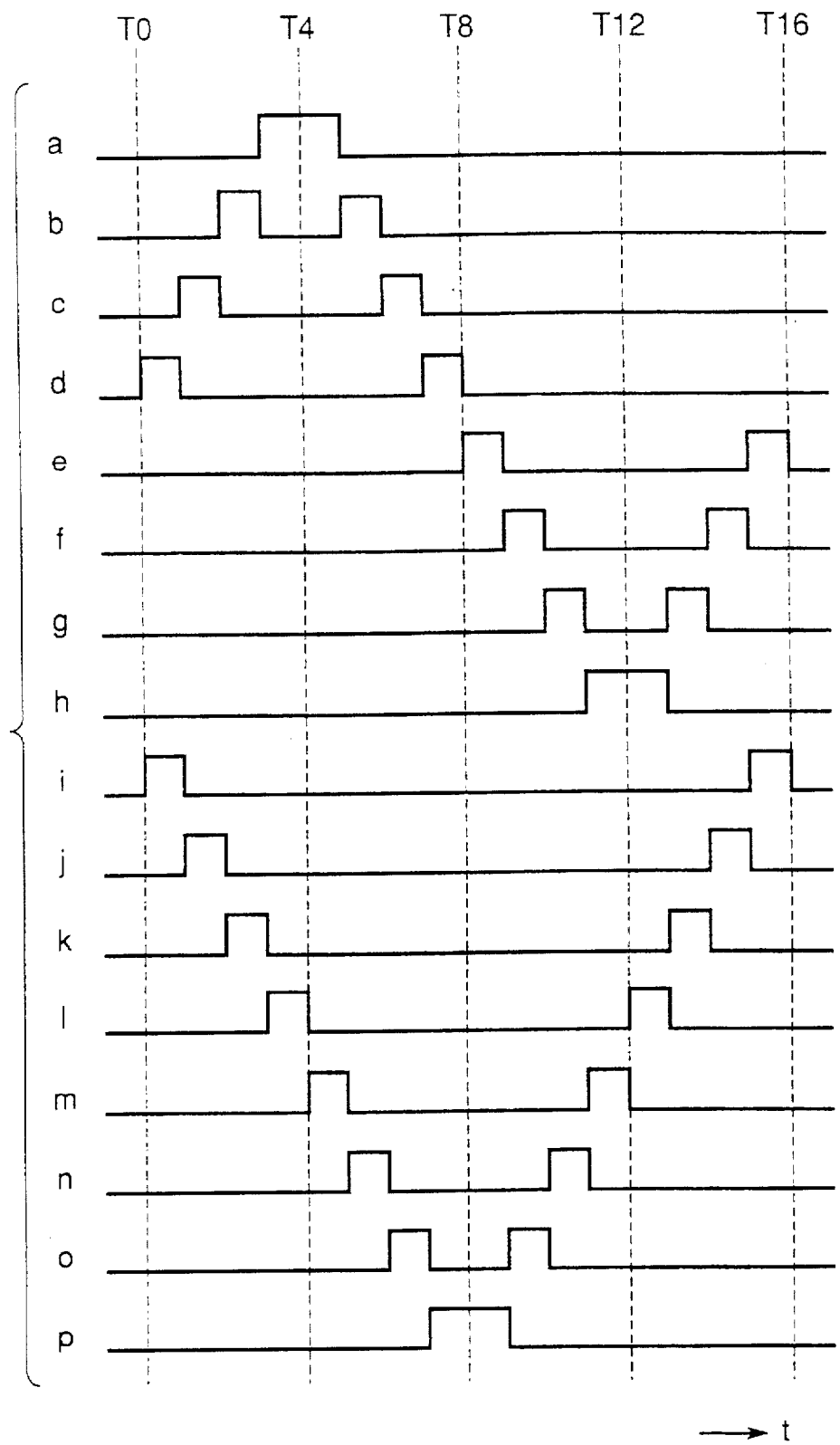
FIG. 10 is a timing chart showing timings of switch switching signals of FIG. 9.
Figure 11:
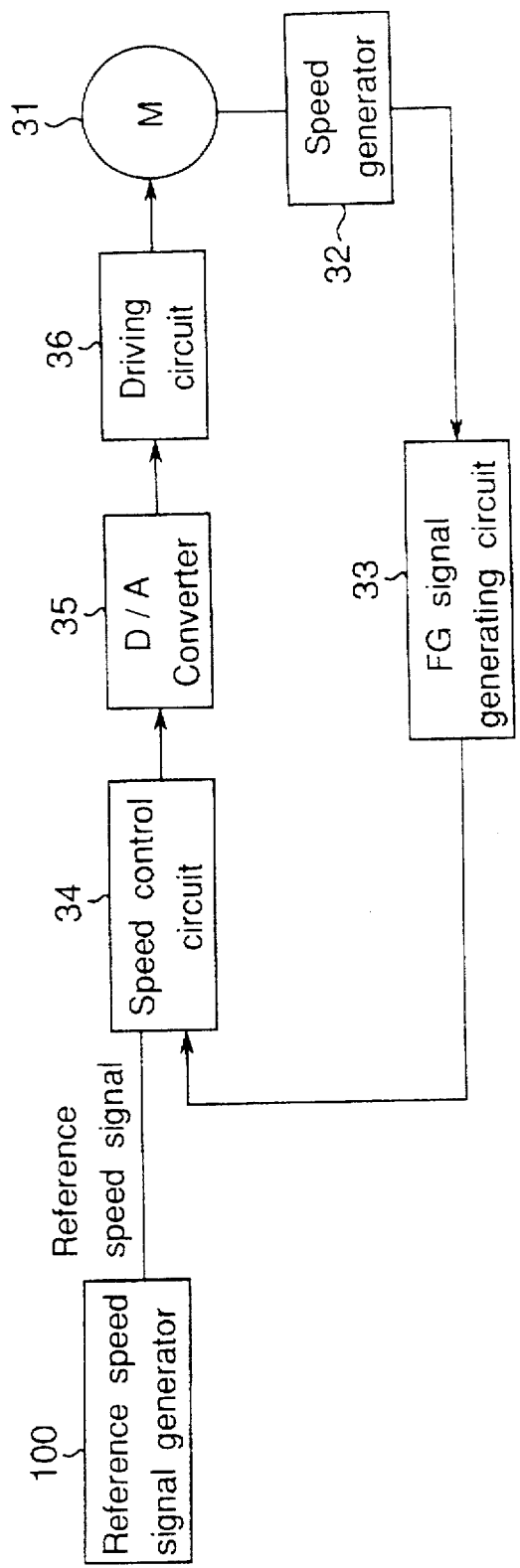
FIG. 11 is a schematic block diagram of a motor control apparatus according to the prior art.

FIG. 10 shows the timings at which the first and second voltage-dividing ratio switching circuits 504 and 505 perform the switching operation in accordance with the switch switching signals Sa and Sb, with the arrangement of FIG. 9.

In FIG. 10, it is shown that the switches 522 and 525 are connected to switch terminals a, b, c, d, e, f, g, h, i, j, k, l, m, n, o, and p of FIG. 9 during the High periods. In FIG. 10, the horizontal axis represents time, where the time interval from T0 to T16 shown in FIG. 10 is assumed to be one cycle, and the timing of T0 serves as the reference for phase comparison.

With regard to the resistors R1, R2, R3, R4, R5, R6 and R7 shown in FIG. 9, the resistance voltage-dividing ratios are determined so that a sine wave type approximation is done in eight steps on the voltages between the amplified output signals and the inverted signals thereof of the rotation detector 501. Not only the output signals "ma" and "mb" from the first and second voltage-dividing ratio switching circuits 504 and 505, but also the output signal "mc" from the adder circuit 506 are the same as those of the first preferred embodiment of the interpolation processing circuit 4.

In the circuit arrangement of the third preferred embodiment of the interpolation processing circuit 4 shown in FIG. 9, as compared with the first preferred embodiment shown in FIG. 5, the two-contact type analog switches 122 and 126 of the voltage-dividing ratio switching circuits 304 and 305 shown in FIG. 5 are not used, so that the possibility of deterioration in the detection precision due to variations in their turn-on resistances has been eliminated. Thus, the circuit arrangement of the third preferred embodiment is advantageous over the first preferred embodiment.

Here is added a description on the controlled motor 1 and the rotation detector 2 of the preferred embodiments according to the present invention as shown in FIGS. 1, 3 and 4.

As the controlled motor 1, it is appropriate to use a brush-equipped DC motor or a brushless motor. More specifically, when a brush-equipped DC motor or a brushless motor is used, the circuit operates so that the positional error is minimized as close to zero as possible in the operation of halt position control, in which case a motor driving current corresponding to a load torque flows. This means that when the load torque is smaller, the motor driving current needs only to be a small one correspondingly, while when the load torque is larger, a motor driving current corresponding to the load torque flows.

That is, unlike conventional stepping motors, a large driving current does not need to flow in order to retain the halt position. This is more advantageous in terms of heat generation and power consumption. In the circuit operation, the feedback loop is made up so that the so-called step-out phenomenon, as would occur to the conventional stepping motors, will not occur.

Further, for the rotation speed control, attaining higher-precision speed control with less low-speed variations is achieved. This eliminates the need of a fly wheel having a larger inertia which would be required for stepping motors.

Also, the rotation detector 2 can be implemented with a relatively simple construction, by making it up from a permanent magnet which is magnetized so as to have multi-poles and which rotates integrally with the motor 1, and a magneto-electrical conversion element which is located in proximity or close to the permanent magnet so as to be electromagnetically coupled with the magnetic field of the permanent magnet and which converts a change in the magnetic field or magnetic force of the permanent magnet into an electrical signal corresponding to a rotational position of the motor 1.

As described hereinabove, the present invention can produce the following advantageous effects.

(a) The motor control apparatus of the present invention is provided with the rotation detector which outputs first and second signals having phases corresponding to a rotational position of the motor 1 and different from each other, and the position detecting circuit including the interpolation processing circuit which detects the rotational position in units which are less than one cycle of the first and second signals. In this arrangement, the reference position signal and the rotational position signal outputted by the position detecting circuit are compared with each other, and the feedback is applied so that the resulting positional error is minimized as close to zero as possible. Since the rotational position of the motor 1 is controlled in this way, rotational position control with high resolution and high positional precision can be attained.

(b) The motor control apparatus of the present invention is provided with the mixing circuit of the adder circuit which mixes or adds up the position control signal outputted from the position control circuit and the speed control signal outputted from the speed control circuit. In this arrangement, the feedback is applied by the output signal from the mixing circuit so that the resulting positional error and the resulting speed error are minimized as close to zero as possible, and then, the rotational position and rotational speed of the motor 1 are controlled. Thus, implementing the control of the halt position and also enhancing the rotational precision at the constant rotational speed is achieved.

(c) The motor control apparatus of the present invention is provided with the position control circuit and the speed control circuit. In this arrangement, the position control signal and the speed control signal outputted from those circuits are switched over depending on a rotational state or rotation speed of the motor 1, and the feedback is applied so that the resulting positional error or the resulting speed error is minimized as close to zero as possible, and then, the rotational position or the rotational speed of the motor 1 is controlled. Thus, even in such a high-speed region that the detection limit of the interpolation processing circuit 4 is reached, maintaining the stable rotational precision without any error is achieved. Further, controlling whether the rotational position precision or the rotational speed precision is enhanced by the switching selection of the switching circuit is also achieved.

(d) The motor control apparatus of the present invention is provided with the first and second voltage-dividing ratio switching circuits for dividing the voltages or the inverted voltages of the output signals from the rotation detector, into voltages of a plurality of n steps, while changing the voltage-dividing ratio. In this case, the detection system is of a type for detecting the phase of the signal of the sum of the output signals of both the switching circuits is detected. In this arrangement, the output signal from the adder circuit can be approximated to a sine waveform, so that the low-pass filter characteristic can be improved, and the harmonic components can be reduced. Thus, any shift of detected position information due to high-frequency components can be prevented, so that the detection precision of rotational position can be enhanced. Further, the voltage of the first output signal or the inverted output signal thereof, as well as a second output signal or the inverted output signal thereof, which are outputted from the rotation detector is divided into voltages of a plurality of n steps in ratios predetermined based on a trigonometric function. Thus, the phase characteristic of the low-pass filter can be even more improved so that the rotational position detection with even higher precision can be expected.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A motor control apparatus for controlling a rotational position and a rotation speed of a motor, comprising:

rotation detecting means for detecting the rotational position of said motor, and outputting first and second detection signals having phases corresponding to a detected rotational position of said motor and being different from each other;

position detecting means for detecting a rotational position of said motor in a unit which is less than one cycle of the first and second detection signals based on the first and second detection signals outputted from said rotation detecting means, and outputting a rotational position signal representing a detected rotational position;

frequency signal generating means for generating and outputting a rotation speed signal corresponding to the rotation speed of said motor based on either one of the first and second detection signals outputted from said rotation detecting means;

position controlling means for detecting a position error between a reference position signal representing a reference position of said motor and the rotational position signal outputted from said position detecting means, and generating and outputting a position control signal representing a detected position error;

speed controlling means for detecting a speed error between a reference speed signal representing a reference speed of said motor and the rotation speed signal outputted from said frequency signal generating means, and generating and outputting a speed control signal representing a detected speed error;

mixing means for adding the position control signal outputted from said position controlling means and the speed control signal outputted from said speed controlling means, and outputting a sum signal representing a sum of the addition; and motor controlling means for controlling the rotational position and the rotation speed of said motor based on the sum signal outputted from said mixing means so that the position error and the speed error are minimized.

2. The motor control apparatus as claimed in claim 1, wherein said position detecting means comprises:

carrier signal generating means for generating and outputting first and second carrier signals having frequencies higher than those of the first and second detection signals and having phases different from each other by a predetermined angle;

modulating means for modulating the first and second carrier signals outputted from said carrier signal generating means according to the first and second detection signals, respectively, and outputting modulated first and second carrier signals;

adder means for adding up the modulated first and second carrier signals outputted from said modulating means, and outputting a sum signal of the addition; and phase detecting means for comparing a phase of the sum signal outputted from said adder means with a phase of either one of the first and second carrier signals outputted from said carrier signal generating means, and detecting a phase representing the rotational position of said motor.

3. The motor control apparatus as claimed in claim 1, wherein said position detecting means comprises:

first inverting means for inverting the first detection signal outputted from said rotation detecting means, and outputting an inverted first detection signal;

second inverting means for inverting the second detection signal outputted from said rotation detecting means, and outputting an inverted second detection signal;

switch switching signal generating means for generating first, second, third and fourth switch switching signals at predetermined timings, respectively;

first switching means, including first and second switches, for switching over said first switch between the first detection signal outputted from said rotation detecting means and the inverted first detection signal outputted from said first inverting means so as to select one of the first detection signal and the inverted first detection signal in accordance with the first switch switching signal outputted from said switch switching signal generating means, for outputting a selected first signal, for switching over said second switch to divide and output a voltage of the selected first signal into voltages of a plurality of n steps in a voltage-dividing ratio which is changed in accordance with the third switch switching signal outputted from said switch switching signal generating means so as to select one of the divided voltages, and for outputting a selected second signal;

second switching means, including third and fourth switches, for switching over said third switch between the second detection signal outputted from said rotation detecting means and the inverted second detection signal outputted from said second inverting means so as to select one of the second detection signal and the inverted second detection signal in accordance with the second switch switching signal outputted from said switch switching signal generating means, for outputting a selected third signal, for switching over said fourth switch to divide and output a voltage of the selected third signal into voltages of a plurality of n steps in a voltage-dividing ratio which is changed in accordance with the fourth switch signal outputted from said switch switching signal generating means so as to select one of the divided voltages, and for outputting a selected fourth signal outputted from said second switching means outputting a sum signal of an addition result; and and adder means for adding up the selected second signal outputted from said first switching means and the selected fourth signal outputted from said second switching means, and outputting a sum signal of the addition; and phase detecting means for detecting a phase representing the rotational position of said motor based on the sum signal outputted from said adder means with the reference to either one of the first and second switch switching signals, and outputting a phase detection signal representing a detected phase, wherein said first and second switching means switch over said first, second, third and fourth switches in voltage-dividing ratios which are predetermined based on a predetermined trigonometric function so that harmonic components of the selected second signal outputted from said first switching means become smaller and harmonic components of the selected fourth signal outputted from said second switching means become smaller.

4. The motor control apparatus as claimed in claim 1 wherein said position detecting means comprises:

first inverting means for inverting the first detection signal outputted from said rotation detecting means, and outputting an inverted first detection signal;

second inverting means for inverting the second detection signal outputted from said rotation detecting means, and outputting an inverted second detection signal;

switch switching signal generating means for generating first and second switch switching signals at predetermined timings, respectively;

first switching means, including a first switch, for switching over said first switch to divide and output a voltage provided between the first detection signal and the inverted first detection signal into voltages of a plurality of 2n steps in a voltage-dividing ratio which is changed in accordance with the first switch switching signal outputted from said switch switching signal generating means so as to select one of the divided voltages, and for outputting a selected first signal;

second switching means, including a second switch, for switching over said second switch to divide and output a voltage provided between the second detection signal and the inverted second detection signal into voltages of a plurality of 2n steps in a voltage-dividing ratio which is changed in accordance with the second switch switching signal outputted from said switch switching signal generating means so as to select one of the divided voltages, and for outputting a selected second signal;

adder means for adding up the selected first signal outputted from said first switching means and the selected second signal outputted from said second switching means, and outputting a sum signal of the addition; and phase detecting means for detecting a phase representing the rotational position of said motor based on the sum signal outputted from said adder means with reference to either one of the first and second switch switching signals, and outputting a phase detection signal representing a detected phase,
wherein said first and second switching means switch over said first and second switches in voltage dividing ratios which are predetermined based on a predetermined trigonometric function so that harmonic components of the selected first signal outputted from said first switching means become smaller and harmonic components of the selected second signal outputted from said second switching means become smaller.

5. The motor control apparatus as claimed in claim 1, wherein said motor is a brush-equipped DC motor.

6. The motor control apparatus as claimed in claim 1, wherein said motor is a brushless motor.

7. The motor control apparatus as claimed in claim 1, wherein said rotation detecting means comprises:

a permanent magnet magnetized so as to have multipoles, said permanent magnet rotating integrally with said motor; and a magneto-electric conversion element disposed close to said permanent magnet so as to be electromagnetically coupled with a magnetic field of said permanent magnet, said magneto-electric conversion element converting a change in the magnetic field of said permanent magnet corresponding to the rotational position of said motor into an electrical signal corresponding to the rotational position of said motor.

8. A motor control apparatus for controlling a rotational position and a rotation speed of a motor, comprising:

rotation detecting means for detecting the rotational position of said motor, and outputting first and second detection signals having phases corresponding to a detected rotational position of said motor and being different from each other;

position detecting means for detecting a rotational position of said motor in a unit which is less than one cycle of the first and second detection signals based on the first and second detection signals outputted from said rotation detecting means, and outputting a rotational position signal representing a detected rotational position;

frequency signal generating means for generating and outputting a rotation speed signal corresponding to the rotation speed of said motor based on both of the first and second detection signals outputted from said rotation detecting means;

position controlling means for detecting a position error between a reference position signal representing a reference position of said motor and the rotational position signal outputted from said position detecting means, and generating and outputting a position control signal representing a detected position error;

speed controlling means for detecting a speed error between a reference speed signal representing a reference speed of said motor and the rotation speed signal outputted from said frequency signal generating means, and generating and outputting a speed control signal representing a detected speed error;

mixing means for adding the position control signal outputted from said position controlling means and the speed control signal outputted from said speed controlling means, and outputting a sum signal representing a sum of the addition; and motor controlling means for controlling the rotational position and the rotation speed of said motor based on the sum signal outputted from said mixing means so that the position error and the speed error are minimized.

9. The motor control apparatus as claimed in claim 8, wherein said position detecting means comprises:

carrier signal generating means for generating and outputting first and second carrier signals having frequencies higher than those of the first and second detection signals and having phases different from each other by a predetermined angle;

modulating means for modulating the first and second carrier signals outputted from said carrier signal generating means according to the first and second detection signals, respectively, and outputting modulated first and second carrier signals;

adder means for adding up the modulated first and second carrier signals outputted from said modulating means, and outputting a sum signal of the addition; and phase detecting means for comparing a phase of the sum signal outputted from said adder means with a phase of either one of the first and second carrier signals outputted from said carrier signal generating means, and detecting a phase representing the rotational position of said motor.

10. The motor control apparatus as claimed in claim 8, wherein said position detecting means comprises:

first inverting means for inverting the first detection signal outputted from said rotation detecting means, and outputting an inverted first detection signal;

second inverting means for inverting the second detection signal outputted from said rotation detecting means, and outputting an inverted second detection signal;

switch switching signal generating means for generating first, second, third and fourth switch switching signals at predetermined timings, respectively;

first switching means, including first and second switches, for switching over said first switch between the first detection signal outputted from said rotation detecting means and the inverted first detection signal outputted from said first inverting means so as to select one of the first detection signal and the inverted first detection signal in accordance with the first switch switching signal outputted from said switch switching signal generating means, for outputting a selected first signal, for switching over said second switch to divide and output a voltage of the selected first signal into voltages of a plurality of n steps in a voltage-dividing ratio which is changed in accordance with the third switch switching signal outputted from said switch switching signal generating means so as to select one of the divided voltages, and for outputting a selected second signal;

second switching means, including third and fourth switches, for switching over said third switch between the second detection signal outputted from said rotation detecting means and the inverted second detection signal outputted from said second inverting means so as to select one of the second detection signal and the inverted second detection signal in accordance with the second switch switching signal outputted from said switch switching signal generating means, for outputting a selected third signal, for switching over said fourth switch to divide and output a voltage of the selected third signal into voltages of a plurality of n steps in a voltage-dividing ratio which is changed in accordance with the fourth switch signal outputted from said switch switching signal generating means so as to select one of the divided voltages, and for outputting a selected fourth signal outputted from said second switching means outputting a sum signal of an addition result; and and adder means for adding up the selected second signal outputted from said first switching means and the selected fourth signal outputted from said second switching means, and outputting a sum signal of the addition; and phase detecting means for detecting a phase representing the rotational position of said motor based on the sum signal outputted from said adder means with the reference to either one of the first and second switch switching signals, and outputting a phase detection signal representing a detected phase, wherein said first and second switching means switch over said first, second, third and fourth switches in voltage-dividing ratios which are predetermined based on a predetermined trigonometric function so that harmonic components of the selected second signal outputted from said first switching means become smaller and harmonic components of the selected fourth signal outputted from said second switching means become smaller.

11. The motor control apparatus as claimed in claim 8 wherein said position detecting means comprises:

first inverting means for inverting the first detection signal outputted from said rotation detecting means, and outputting an inverted first detection signal;

second inverting means for inverting the second detection signal outputted from said rotation detecting means, and outputting an inverted second detection signal;

switch switching signal generating means for generating first and second switch switching signals at predetermined timings, respectively;

first switching means, including a first switch, for switching over said first switch to divide and output a voltage provided between the first detection signal and the inverted first detection signal into voltages of a plurality of 2n steps in a voltage-dividing ratio which is changed in accordance with the first switch switching signal outputted from said switch switching signal generating means so as to select one of the divided voltages, and for outputting a selected first signal;

second switching means, including a second switch, for switching over said second switch to divide and output a voltage provided between the second detection signal and the inverted second detection signal into voltages of a plurality of 2n steps in a voltage-dividing ratio which is changed in accordance with the second switch switching signal outputted from said switch switching signal generating means so as to select one of the divided voltages, and for outputting a selected second signal;

adder means for adding up the selected first signal outputted from said first switching means and the selected second signal outputted from said second switching means, and outputting a sum signal of the addition; and phase detecting means for detecting a phase representing the rotational position of said motor based on the sum signal outputted from said adder means with reference to either one of the first and second switch switching signals, and outputting a phase detection signal representing a detected phase, wherein said first and second switching means switch over said first and second switches in voltage dividing ratios which are predetermined based on a predetermined trigonometric function so that harmonic components of the selected first signal outputted from said first switching means become smaller and harmonic components of the selected second signal outputted from said second switching means become smaller.

12. The motor control apparatus as claimed in claim 8, wherein said motor is a brush-equipped DC motor.

13. The motor control apparatus as claimed in claim 8, wherein said motor is a brushless motor.

14. The motor control apparatus as claimed in claim 8, wherein said rotation detecting means comprises:

a permanent magnet magnetized so as to have multi-poles, said permanent magnet rotating integrally with said motor; and a magneto-electric conversion element disposed close to said permanent magnet so as to be electromagnetically coupled with a magnetic field of said permanent magnet, said magneto-electric conversion element converting a change in the magnetic field of said permanent magnet corresponding to the rotational position of said motor into an electrical signal corresponding to the rotational position of said motor.

15. A motor control apparatus for controlling either one of a rotational position and a rotation speed of a motor, comprising:

rotation detecting means for detecting the rotational position of said motor, and outputting first and second detection signals having phases corresponding to a detected rotational position of said motor and being different from each other;

position detecting means for detecting a rotational position of said motor in a unit which is less than one cycle of the first and second detection signals based on the first and second detection signals outputted from said rotation detecting means, and outputting a rotational position signal representing a detected rotational position;

frequency signal generating means for generating and outputting a rotation speed signal corresponding to the rotation speed of said motor based on either one of the first and second detection signals outputted from said rotation detecting means;

position controlling means for detecting a position error between a reference position signal representing a reference position of said motor and the rotational position signal outputted from said position detecting means, and generating and outputting a position control signal representing a detected position error;

speed controlling means for detecting a speed error between a reference speed signal representing a reference speed of said motor and the rotation speed signal outputted from said frequency signal generating means, and generating and outputting a speed control signal representing a detected speed error;

switching means for switching over between the position control signal outputted from said position controlling means and the speed control signal outputted from said speed controlling means so as to select either one of the position control signal and the speed control signal in accordance with the rotation speed of said motor represented by the rotation speed signal outputted from said frequency signal generating means, and outputting a selected control signal; and motor controlling means for controlling either one of the rotational position and the rotation speed of said motor based on the selected control signal outputted from switching means so that either one of the position error and the speed error are minimized.

16. The motor control apparatus as claimed in claim 15, wherein said position detecting means comprises:

carrier signal generating means for generating and outputting first and second carrier signals having frequencies higher than those of the first and second detection signals and having phases different from each other by a predetermined angle;

modulating means for modulating the first and second carrier signals outputted from said carrier signal generating means according to the first and second detection signals, respectively, and outputting modulated first and second carrier signals;

adder means for adding up the modulated first and second carrier signals outputted from said modulating means, and outputting a sum signal of the addition; and phase detecting means for comparing a phase of the sum signal outputted from said adder means with a phase of either one of the first and second carrier signals outputted from said carrier signal generating means, and detecting a phase representing the rotational position of said motor.

17. The motor control apparatus as claimed in claim 15, wherein said position detecting means comprises:

first inverting means for inverting the first detection signal outputted from said rotation detecting means, and outputting an inverted first detection signal;

second inverting means for inverting the second detection signal outputted from said rotation detecting means, and outputting an inverted second detection signal;

switch switching signal generating means for generating first, second, third and fourth switch switching signals at predetermined timings, respectively;

first switching means, including first and second switches, for switching over said first switch between the first detection signal outputted from said rotation detecting means and the inverted first detection signal outputted from said first inverting means so as to select one of the first detection signal and the inverted first detection signal in accordance with the first switch switching signal outputted from said switch switching signal generating means, for outputting a selected first signal, for switching over said second switch to divide and output a voltage of the selected first signal into voltages of a plurality of n steps in a voltage-dividing ratio which is changed in accordance with the third switch switching signal outputted from said switch switching signal generating means so as to select one of the divided voltages, and for outputting a selected second signal;

second switching means, including third and fourth switches, for switching over said third switch between the second detection signal outputted from said rotation detecting means and the inverted second detection signal outputted from said second inverting means so as to select one of the second detection signal and the inverted second detection signal in accordance with the second switch switching signal outputted from said switch switching signal generating means, for outputting a selected third signal, for switching over said fourth switch to divide and output a voltage of the selected third signal into voltages of a plurality of n steps in a voltage-dividing ratio which is changed in accordance with the fourth switch signal outputted from said switch switching signal generating means so as to select one of the divided voltages, and for outputting a selected fourth signal outputted from said second switching means outputting a sum signal of an addition result; and and adder means for adding up the selected second signal outputted from said first switching means and the selected fourth signal outputted from said second switching means, and outputting a sum signal of the addition; and phase detecting means for detecting a phase representing the rotational position of said motor based on the sum signal outputted from said adder means with the reference to either one of the first and second switch switching signals, and outputting a phase detection signal representing a detected phase.

wherein said first and second switching means switch over said first, second, third and fourth switches in voltage-dividing ratios which are predetermined based on a predetermined trigonometric function so that harmonic components of the selected second signal outputted from said first switching means become smaller and harmonic components of the selected fourth signal outputted from said second switching means become smaller.

18. The motor control apparatus as claimed in claim 15 wherein said position detecting means comprises:

first inverting means for inverting the first detection signal outputted from said rotation detecting means, and outputting an inverted first detection signal;

second inverting means for inverting the second detection signal outputted from said rotation detecting means, and outputting an inverted second detection signal;

switch switching signal generating means for generating first and second switch switching signals at predetermined timings, respectively;

first switching means, including a first switch, for switching over said first switch to divide and output a voltage provided between the first detection signal and the inverted first detection signal into voltages of a plurality of 2n steps in a voltage-dividing ratio which is changed in accordance with the first switch switching signal outputted from said switch switching signal generating means so as to select one of the divided voltages, and for outputting a selected first signal;

second switching means, including a second switch, for switching over said second switch to divide and output a voltage provided between the second detection signal and the inverted second detection signal into voltages of a plurality of 2n steps in a voltage-dividing ratio which is changed in accordance with the second switch switching signal outputted from said switch switching signal generating means so as to select one of the divided voltages, and for outputting a selected second signal;

adder means for adding up the selected first signal outputted from said first switching means and the selected second signal outputted from said second switching means, and outputting a sum signal of the addition; and phase detecting means for detecting a phase representing the rotational position of said motor based on the sum signal outputted from said adder means with reference to either one of the first and second switch switching signals, and outputting a phase detection signal representing a detected phase, wherein said first and second switching means switch over said first and second switches in voltage dividing ratios which are predetermined based on a predetermined trigonometric function so that harmonic components of the selected first signal outputted from said first switching means become smaller and harmonic components of the selected second signal outputted from said second switching means become smaller.

19. The motor control apparatus as claimed in claim 15, wherein said motor is a brush-equipped DC motor.

20. The motor control apparatus as claimed in claim 15, wherein said motor is a brushless motor.

21. The motor control apparatus as claimed in claim 15, wherein said rotation detecting means comprises:

a permanent magnet magnetized so as to have multipoles, said permanent magnet rotating integrally with said motor; and a magneto-electric conversion element disposed close to said permanent magnet so as to be electromagnetically coupled with a magnetic field of said permanent magnet, said magneto-electric conversion element converting a change in the magnetic field of said permanent magnet corresponding to the rotational position of said motor into an electrical signal corresponding to the rotational position of said motor.

22. A motor control apparatus for controlling either one of a rotational position and a rotation speed of a motor, comprising:

rotation detecting means for detecting the rotational position of said motor, and outputting first and second detection signals having phases corresponding to a detected rotational position of said motor and being different from each other;

position detecting means for detecting a rotational position of said motor in a unit which is less than one cycle of the first and second detection signals based on the first and second detection signals outputted from said rotation detecting means, and outputting a rotational position signal representing a detected rotational position;

frequency signal generating means for generating and outputting a rotation speed signal corresponding to the rotation speed of said motor based on either one of the first and second detection signals outputted from said rotation detecting means;

position controlling means for detecting a position error between a reference position signal representing a reference position of said motor and the rotational position signal outputted from said position detecting means, and generating and outputting a position control signal representing a detected position error;

speed controlling means for detecting a speed error between a reference speed signal representing a reference speed of said motor and the rotation speed signal outputted from said frequency signal generating means, and generating and outputting a speed control signal representing a detected speed error;

switching means for switching over between the position control signal outputted from said position controlling means and the speed control signal outputted from said speed controlling means so as to select either one of the position control signal and the speed control signal in accordance with the rotation speed of said motor represented by the reference speed signal, and outputting a selected control signal; and motor controlling means for controlling either one of the rotational position and the rotation speed of said motor based on the selected control signal outputted from switching means so that either one of the position error and the speed error are minimized.

23. The motor control apparatus as claimed in claim 22, wherein said position detecting means comprises:

carrier signal generating means for generating and outputting first and second carrier signals having frequencies higher than those of the first and second detection signals and having phases different from each other by a predetermined angle;

modulating means for modulating the first and second carrier signals outputted from said carrier signal generating means according to the first and second detection signals, respectively, and outputting modulated first and second carrier signals;

adder means for adding up the modulated first and second carrier signals outputted from said modulating means, and outputting a sum signal of the addition; and phase detecting means for comparing a phase of the sum signal outputted from said adder means with a phase of either one of the first and second carrier signals outputted from said carrier signal generating means, and detecting a phase representing the rotational position of said motor.

24. The motor control apparatus as claimed in claim 22, wherein said position detecting means comprises:

first inverting means for inverting the first detection signal outputted from said rotation detecting means, and outputting an inverted first detection signal;

second inverting means for inverting the second detection signal outputted from said rotation detecting means, and outputting an inverted second detection signal;

switch switching signal generating means for generating first, second, third and fourth switch switching signals at predetermined timings, respectively;

first switching means, including first and second switches, for switching over said first switch between the first detection signal outputted from said rotation detecting means and the inverted first detection signal outputted from said first inverting means so as to select one of the first detection signal and the inverted first detection signal in accordance with the first switch switching signal outputted from said switch switching signal generating means, for outputting a selected first signal, for switching over said second switch to divide and output a voltage of the selected first signal into voltages of a plurality of n steps in a voltage-dividing ratio which is changed in accordance with the third switch switching signal outputted from said switch switching signal generating means so as to select one of the divided voltages, and for outputting a selected second signal;

second switching means, including third and fourth switches, for switching over said third switch between the second detection signal outputted from said rotation detecting means and the inverted second detection signal outputted from said second inverting means so as to select one of the second detection signal and the inverted second detection signal in accordance with the second switch switching signal outputted from said switch switching signal generating means, for outputting a selected third signal, for switching over said fourth switch to divide and output a voltage of the selected third signal into voltages of a plurality of n steps in a voltage-dividing ratio which is changed in accordance with the fourth switch signal outputted from said switch switching signal generating means so as to select one of the divided voltages, and for outputting a selected fourth signal outputted from said second switching means outputting a sum signal of an addition result; and and adder means for adding up the selected second signal outputted from said first switching means and the selected fourth signal outputted from said second switching means, and outputting a sum signal of the addition; and phase detecting means for detecting a phase representing the rotational position of said motor based on the sum signal outputted from said adder means with the reference to either one of the first and second switch switching signals, and outputting a phase detection signal representing a detected phase, wherein said first and second switching means switch over said first, second, third and fourth switches in voltage-dividing ratios which are predetermined based on a predetermined trigonometric function so that harmonic components of the selected second signal outputted from said first switching means become smaller and harmonic components of the selected fourth signal outputted from said second switching means become smaller.

25. The motor control apparatus as claimed in claim 22 wherein said position detecting means comprises:

first inverting means for inverting the first detection signal outputted from said rotation detecting means, and outputting an inverted first detection signal;

second inverting means for inverting the second detection signal outputted from said rotation detecting means, and outputting an inverted second detection signal;

switch switching signal generating means for generating first and second switch switching signals at predetermined timings, respectively;

first switching means, including a first switch, for switching over said first switch to divide and output a voltage provided between the first detection signal and the inverted first detection signal into voltages of a plurality of 2n steps in a voltage-dividing ratio which is changed in accordance with the first switch switching signal outputted from said switch switching signal generating means so as to select one of the divided voltages, and for outputting a selected first signal;

second switching means, including a second switch, for switching over said second switch to divide and output a voltage provided between the second detection signal and the inverted second detection signal into voltages of a plurality of 2n steps in a voltage-dividing ratio which is changed in accordance with the second switch switching signal outputted from said switch switching signal generating means so as to select one of the divided voltages, and for outputting a selected second signal;

adder means for adding up the selected first signal outputted from said first switching means and the selected second signal outputted from said second switching means, and outputting a sum signal of the addition; and phase detecting means for detecting a phase representing the rotational position of said motor based on the sum signal outputted from said adder means with reference to either one of the first and second switch switching signals, and outputting a phase detection signal representing a detected phase, wherein said first and second switching means switch over said first and second switches in voltage dividing ratios which are predetermined based on a predetermined trigonometric function so that harmonic components of the selected first signal outputted from said first switching means become smaller and harmonic components of the selected second signal outputted from said second switching means become smaller.

26. The motor control apparatus as claimed in claim 22, wherein said motor is a brush-equipped DC motor.

27. The motor control apparatus as claimed in claim 22, wherein said motor is a brushless motor.

28. The motor control apparatus as claimed in claim 22, wherein said rotation detecting means comprises:

a permanent magnet magnetized so as to have multipoles, said permanent magnet rotating integrally with said motor; and a magneto-electric conversion element disposed close to said permanent magnet so as to be electromagnetically coupled with a magnetic field of said permanent magnet, said magneto-electric conversion element converting a change in the magnetic field of said permanent magnet corresponding to the rotational position of said motor into an electrical signal corresponding to the rotational position of said motor.

29. A motor control apparatus for controlling a rotational position of a motor, comprising:

rotation detecting means for detecting the rotational position of said motor, and outputting first and second detection signals having phases corresponding to a detected rotational position of said motor and being different from each other;

position detecting means for detecting a rotational position of said motor in a unit which is less than one cycle of the first and second detection signals based on the first and second detection signals outputted from said rotation detecting means, and outputting a rotational position signal representing a detected rotational position; and motor controlling means for comparing the rotational position signal outputted from said position detecting means with a reference position signal representing a reference rotational position of said motor to obtain a position error, and controlling the rotational position of said motor so that the position error is minimized;

wherein said position detecting means comprises:

carrier signal generating means for generating and outputting first and second carrier signals having frequencies higher than those of the first and second detection signals and having phases different from each other by a predetermined angle;

modulating means for modulating the first and second carrier signals outputted from said carrier signal generating means according to the first and second detection signals, respectively, and outputting modulated first and second carrier signals;

adder means for adding up the modulated first and second carrier signals outputted from said modulating means, and outputting a sum signal of the addition; and phase detecting means for comparing a phase of the sum signal outputted from said adder means with a phase of either one of the first and second carrier signals outputted from said carrier signal generating means, and detecting a phase representing the rotational position of said motor.

30. The motor control apparatus as claimed in claim 29, wherein said motor is a brush-equipped DC motor.

31. The motor control apparatus as claimed in claim 29, wherein said motor is a brushless motor.

32. The motor control apparatus as claimed in claim 29, wherein said rotation detecting means comprises:

a permanent magnet magnetized so as to have multi-poles, said permanent magnet rotating integrally with said motor; and a magneto-electric conversion element disposed close to said permanent magnet so as to be electromagnetically coupled with a magnetic field of said permanent magnet, said magneto-electric conversion element converting a change in the magnetic field of said permanent magnet corresponding to the rotational position of said motor into an electrical signal corresponding to the rotational position of said motor.

33. A motor control apparatus for controlling a rotational position of a motor, comprising:

rotation detecting means for detecting the rotational position of said motor, and outputting first and second detection signals having phases corresponding to a detected rotational position of said motor and being different from each other;

position detecting means for detecting a rotational position of said motor in a unit which is less than one cycle of the first and second detection signals based on the first and second detection signals outputted from said rotation detecting means and outputting a rotational position signal representing a detected rotational position; and motor controlling means for comparing the rotational position signal outputted from said position detecting means with a reference position signal representing a reference rotational position of said motor to obtain a position error and controlling the rotational position of said motor so that the position error is minimized;

wherein said position detecting means comprises:

first inverting means for inverting the first detection signal outputted from said rotation detecting means, and outputting an inverted first detection signal;

second inverting means for inverting the second detection signal outputted from said rotation detecting means, and outputting an inverted second detection signal;

switch switching signal generating means for generating first, second, third and fourth switch switching signals at predetermined timings, respectively;

first switching means, including first and second switches, for switching over said first switch between the first detection signal outputted from said rotation detecting means and the inverted first detection signal outputted from said first inverting means so as to select one of the first detection signal and the inverted first detection signal in accordance with the first switch switching signal outputted from said switch switching signal generating means, for outputting a selected first signal, for switching over said second switch to divide and output a voltage of the selected first signal into voltages of a plurality of n steps in a voltage-dividing ratio which is changed in accordance with the third switch switching signal outputted from said switch switching signal generating means so as to select one of the divided voltages, and for outputting a selected second signal;

second switching means, including third and fourth switches, for switching over said third switch between the second detection signal outputted from said rotation detecting means and the inverted second detection signal outputted from said second inverting means so as to select one of the second detection signal and the inverted second detection signal in accordance with the second switch switching signal outputted from said switch switching signal generating means, for outputting a selected third signal, for switching over said fourth switch to divide and output a voltage of the selected third signal into voltages of a plurality of n steps in a voltage-dividing ratio which is changed in accordance with the fourth switch signal outputted from said switch switching signal generating means so as to select one of the divided voltages, and for outputting a selected fourth signal outputted from said second switching means outputting a sum signal of an addition result; and and adder means for adding up the selected second signal outputted from said first switching means and the selected fourth signal outputted from said second switching means, and outputting a sum signal of the addition; and phase detecting means for detecting a phase representing the rotational position of said motor based on the sum signal outputted from said adder means with the reference to either one of the first and second switch switching signals, and outputting a phase detection signal representing a detected phase, wherein said first and second switching means switch over said first, second, third and fourth switches in voltage-dividing ratios which are predetermined based on a predetermined trigonometric function so that harmonic components of the selected second signal outputted from said first switching means become smaller and harmonic components of the selected fourth signal outputted from said second switching means become smaller.

34. The motor control apparatus as claimed in claim 33, wherein said motor is a brush-equipped DC motor.

35. The motor control apparatus as claimed in claim 33, wherein said motor is a brushless motor.

36. The motor control apparatus as claimed in claim 33, wherein said rotation detecting means comprises:

a permanent magnet magnetized so as to have multi-poles, said permanent magnet rotating integrally with said motor; and a magneto-electric conversion element disposed close to said permanent magnet so as to be electromagnetically coupled with a magnetic field of said permanent magnet, said magneto-electric conversion element converting a change in the magnetic field of said permanent magnet corresponding to the rotational position of said motor into an electrical signal corresponding to the rotational position of said motor.

37. A motor control apparatus for controlling a rotational position of a motor, comprising:

rotation detecting means for detecting the rotational position of said motor, and outputting first and second detection signals having phases corresponding to a detected rotational position of said motor and being different from each other;

position detecting means for detecting a rotational position of said motor in a unit which is less than one cycle of the first and second detection signals based on the first and second detection signals outputted from said rotation detecting means, and outputting a rotational position signal representing a detected rotational position; and motor controlling means for comparing the rotational position signal outputted from said position detecting means with a reference position signal representing a reference rotational position of said motor to obtain a position error, and controlling the rotational position of said motor so that the position error is minimized;

wherein said position detecting means comprises:

first inverting means for inverting the first detection signal outputted from said rotation detecting means, and outputting an inverted first detection signal;

second inverting means for inverting the second detection signal outputted from said rotation detecting means, and outputting an inverted second detection signal;

switch switching signal generating means for generating first and second switch switching signals at predetermined timings, respectively;

first switching means, including a first switch, for switching over said first switch to divide and output a voltage provided between the first detection signal and the inverted first detection signal into voltages of a plurality of 2n steps in a voltage-dividing ratio which is changed in accordance with the first switch switching signal outputted from said switch switching signal generating means so as to select one of the divided voltages, and for outputting a selected first signal;

second switching means, including a second switch, for switching over said second switch to divide and output a voltage provided between the second detection signal and the inverted second detection signal into voltages of a plurality of 2n steps in a voltage-dividing ratio which is changed in accordance with the second switch switching signal outputted from said switch switching signal generating means so as to select one of the divided voltages, and for outputting a selected second signal;

adder means for adding up the selected first signal outputted from said first switching means and the selected second signal outputted from said second switching means, and outputting a sum signal of the addition; and phase detecting means for detecting a phase representing the rotational position of said motor based on the sum signal outputted from said adder means with reference to either one of the first and second switch switching signals, and outputting a phase detection signal representing a detected phase, wherein said first and second switching means switch over said first and second switches in voltage dividing ratios which are predetermined based on a predetermined trigonometric function so that harmonic components of the selected first signal outputted from said first switching means become smaller and harmonic components of the selected second signal outputted from said second switching means become smaller.

38. The motor control apparatus as claimed in claim 37, wherein said motor is a brush-equipped DC motor.

39. The motor control apparatus as claimed in claim 37, wherein said motor is a brushless motor.

40. The motor control apparatus as claimed in claim 37, wherein said rotation detecting means comprises:

a permanent magnet magnetized so as to have multi-poles, said permanent magnet rotating integrally with said motor; and a magneto-electric conversion element disposed close to said permanent magnet so as to be electromagnetically coupled with a magnetic field of said permanent magnet, said magneto-electric conversion element converting a change in the magnetic field of said permanent magnet corresponding to the rotational position of said motor into an electrical signal corresponding to the rotational position of said motor.

* * * * *